United States Patent
Leydon et al.

(10) Patent No.: US 10,484,190 B2
(45) Date of Patent: Nov. 19, 2019

(54) MANAGING CHANNELS IN AN OPEN DATA ECOSYSTEM

(71) Applicant: Satori Worldwide, LLC, Palo Alto, CA (US)

(72) Inventors: Gabriel Leydon, Menlo Park, CA (US); Francois Orsini, San Francisco, CA (US); Steven Brooks, Pleasanton, CA (US); Winnie Tseng-Mueller, Redwood Shores, CA (US); Boaz Sedan, Palo Alto, CA (US); Cynthia Chu, San Mateo, CA (US); Anton Koinov, Santa Clara, CA (US); Sarit Arcushin-Yaakobovitz, Sunnyvale, CA (US)

(73) Assignee: SATORI WORLDWIDE, LLC, Palo Alto, CA (US)

( * ) Notice: Subject to any disclaimer, the term of this patent is extended or adjusted under 35 U.S.C. 154(b) by 0 days.

(21) Appl. No.: 15/902,694

(22) Filed: Feb. 22, 2018

(65) Prior Publication Data
US 2018/0248709 A1    Aug. 30, 2018

Related U.S. Application Data

(60) Provisional application No. 62/479,961, filed on Mar. 31, 2017, provisional application No. 62/463,326, filed on Feb. 24, 2017.

(51) Int. Cl.
*H04L 12/18* (2006.01)
*H04L 29/08* (2006.01)
(Continued)

(52) U.S. Cl.
CPC ........ *H04L 12/1859* (2013.01); *G06F 3/0481* (2013.01); *G06F 16/958* (2019.01);
(Continued)

(58) Field of Classification Search
CPC ..... H04L 12/1859; H04L 51/10; H04L 51/14; G06F 17/3089
See application file for complete search history.

(56) References Cited

U.S. PATENT DOCUMENTS 9,882,716 B2 *   1/2018   Cho .................... H04L 9/0852
2004/0019645 A1  1/2004   Goodman et al.
(Continued)

OTHER PUBLICATIONS

"SAS 9.3 Integration Technologies Overview", ip.com Journal, ip.com Inc., West Henrietta, NY, US, Sep. 17, 2015.
(Continued)

*Primary Examiner* — Arvin Eskandarnia
(74) *Attorney, Agent, or Firm* — Womble Bond Dickinson (US) LLP; Daniel E. Ovanezian

(57) ABSTRACT

Methods, systems, and apparatus, including computer programs encoded on a computer storage medium, for managing channels in an open data ecosystem. A method includes providing one or more graphical user interfaces to a first user of an open data ecosystem. The open data ecosystem includes a plurality of public channels and a plurality of private channels. The users of the open data ecosystem are able to receive messages on each of the plurality of public channels. The method also includes receiving first user input from the first user via the one or more graphical user interfaces. The method further includes configuring one or more channels of the plurality of public channels or the plurality of private channels based on the first user input received from the first user via the one or more graphical user interfaces.

20 Claims, 23 Drawing Sheets

(51) Int. Cl.
*H04L 12/58* (2006.01)
*G06F 16/958* (2019.01)
*G06F 3/0481* (2013.01)

(52) U.S. Cl.
CPC .............. *H04L 51/10* (2013.01); *H04L 51/12* (2013.01); *H04L 51/14* (2013.01); *H04L 67/26* (2013.01); *H04L 51/046* (2013.01); *H04L 51/30* (2013.01)

(56) References Cited

U.S. PATENT DOCUMENTS

| | | | | |
|---|---|---|---|---|
| 2004/0163127 | A1* | 8/2004 | Karaoguz | H04L 12/2803 |
| | | | | 725/120 |
| 2013/0217346 | A1* | 8/2013 | Freeman | H04W 4/70 |
| | | | | 455/90.1 |
| 2014/0068593 | A1* | 3/2014 | McErlane | G06F 8/61 |
| | | | | 717/171 |
| 2015/0149305 | A1 | 5/2015 | Zhang | |
| 2016/0149798 | A1* | 5/2016 | Kang | H04L 12/1859 |
| | | | | 709/206 |
| 2016/0301979 | A1* | 10/2016 | Phadnis | G06Q 30/06 |

OTHER PUBLICATIONS

International Search Report and Written Opinion of the International Searching Authority dated Jun. 1, 2018 for International Application No. PCT/US2018/019562.

* cited by examiner

MANAGING CHANNELS IN AN OPEN DATA ECOSYSTEM

CROSS-REFERENCE TO RELATED APPLICATIONS

This application claims the benefit of U.S. Provisional Patent Application No. 62/463,326, filed on Feb. 24, 2017 and claims the benefit of U.S. Provisional Patent Application No. 62/479,961, filed on Mar. 31, 2017. The disclosures of the above-referenced applications are hereby incorporated by reference in their entireties.

BACKGROUND

This specification relates to a data communication system and, in particular, systems and methods for managing channels in an open data ecosystem.

The publish-subscribe (or "PubSub") pattern is a data communication messaging arrangement implemented by software systems where so-called publishers publish messages to topics and so-called subscribers receive the messages pertaining to particular topics to which they are subscribed. There can be one or more publishers per topic and publishers generally have no knowledge of what subscribers, if any, will receive the published messages. Because publishers may publish large volumes of messages, and subscribers may subscribe to many topics (or "channels") the overall volume of messages directed to a particular channel and/or subscriber may be difficult to manage.

DETAILED DESCRIPTION

Elements of examples or embodiments described with respect to a given aspect of the invention can be used in various embodiments of another aspect of the invention. For example, it is contemplated that features of dependent claims depending from one independent claim can be used in apparatus, systems, and/or methods of any of the other independent claims.

The details of one or more embodiments of the subject matter described in this specification are set forth in the accompanying drawings and the description below. Other features, aspects, and advantages of the subject matter will become apparent from the description, the drawings, and the claims.

A messaging system may support the PubSub communication pattern and may allow publishers and subscribers to publish and receive live messages or live data. The publishers may publish live data to the open data ecosystem, which may be accessed by all users of the open data ecosystem, as discussed in more detail below. The publishers may each exchange live data with each other by publishing the live data to public channels of the open data ecosystem. This may enable publishers to develop various applications, which may use the live data to perform various functions, operations, methods, etc., as discussed in more detail below. As more and more users (e.g., more and more publishers) use the open data ecosystem, it may be become difficult for administrators or users of the open data ecosystem to configure (e.g., to manage) the many channels that may be part of the open data ecosystem.

The implementations, embodiments, and examples described herein may allow various different types of users to configure the different channels of the open data ecosystem. The open data ecosystem may provide various GUIs to publishers to allow publishers to create accounts, create channels, update channel information, request conversions of channels from private to public, etc. The open data ecosystem may also provide various GUIs to administrators to allow administrators to view channel information, approve or reject requests to convert channels from private to public, etc. The GUIs provided by the open data ecosystem may streamline the process for configuring channels by providing users with a graphical system for configuring and maintaining the channels.

Figure 1A:
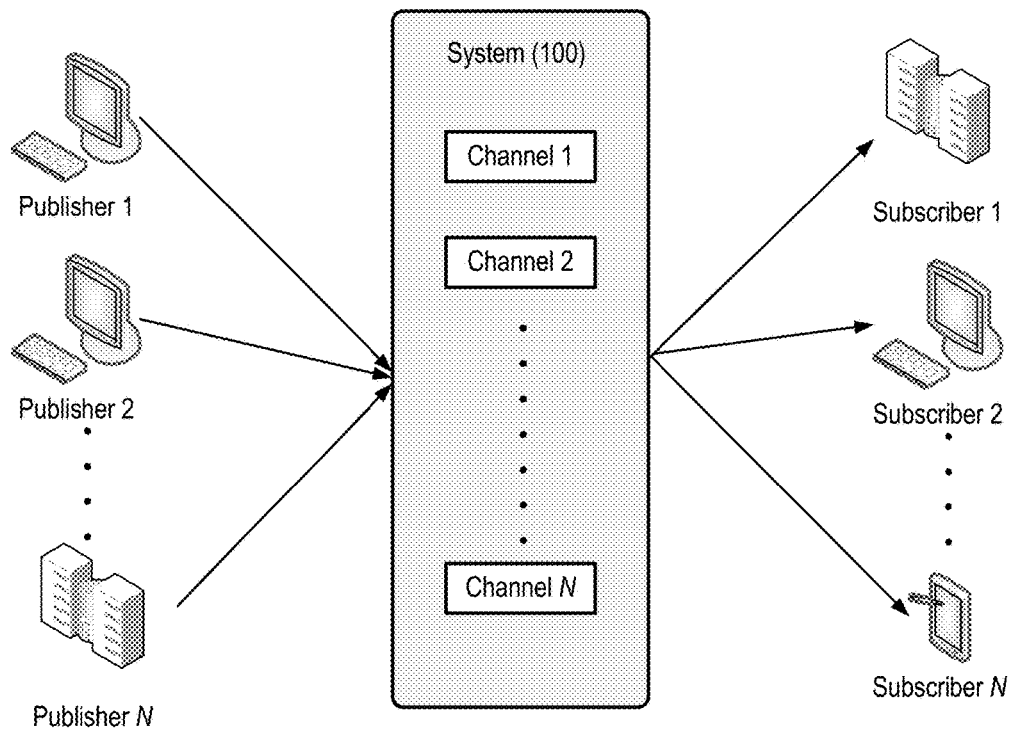
FIG. 1A illustrates an example system that supports the PubSub communication pattern.

FIG. 1A illustrates an example system 100 that supports the PubSub communication pattern. Publisher clients (e.g., Publisher 1) can publish messages to named channels (e.g., "Channel 1") by way of the system 100. A message can comprise any type of information including one or more of the following: text, image content, sound content, multimedia content, video content, binary data, and so on. Other types of message data are possible. Subscriber clients (e.g., Subscriber 2) can subscribe to a named channel using the system 100 and start receiving messages which occur after the subscription request or from a given position (e.g., a message number or time offset). A client can be both a publisher and a subscriber.

Depending on the configuration, a PubSub system can be categorized as follows:

One to One (1:1). In this configuration there is one publisher and one subscriber per channel. A typical use case is private messaging.

One to Many (1:N). In this configuration there is one publisher and multiple subscribers per channel. Typical use cases are broadcasting messages (e.g., stock prices).

Many to Many (M:N). In this configuration there are many publishers publishing to a single channel. The messages are then delivered to multiple subscribers. Typical use cases are map applications.

There is no separate operation needed to create a named channel. A channel is created implicitly when the channel is subscribed to or when a message is published to the channel. In some implementations, channel names can be qualified by a name space. A name space comprises one or more channel names. Different name spaces can have the same channel names without causing ambiguity. The name space name can be a prefix of a channel name where the name space and channel name are separated by a dot or other suitable separator. In some implementations, name spaces can be used when specifying channel authorization settings. For instance, the messaging system 100 may have app1.foo and app1.system.notifications channels where "app1" is the name of the name space. The system can allow clients to subscribe and publish to the app1.foo channel. However, clients can only subscribe to, but not publish to the app1.system.notifications channel.

Figure 1B:
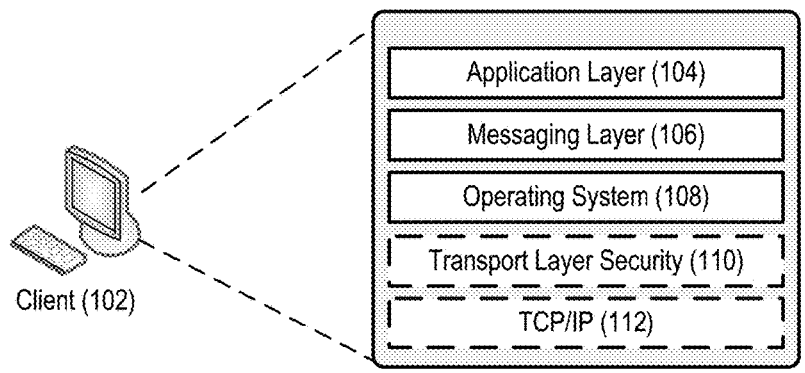
FIG. 1B illustrates functional layers of software on an example client device.

FIG. 1B illustrates functional layers of software on an example client device. A client device (e.g., client 102) is a data processing apparatus such as, for example, a personal computer, a laptop computer, a tablet computer, a smart phone, a smart watch, or a server computer. Other types of client devices are possible. The application layer 104 comprises the end-user application(s) that will integrate with the PubSub system 100. The messaging layer 106 is a programmatic interface for the application layer 104 to utilize services of the system 100 such as channel subscription, message publication, message retrieval, user authentication, and user authorization. In some implementations, the messages passed to and from the messaging layer 106 are encoded as JavaScript Object Notation (JSON) objects. Other message encoding schemes are possible.

The operating system 108 layer comprises the operating system software on the client 102. In various implementations, messages can be sent and received to/from the system 100 using persistent or non-persistent connections. Persistent connections can be created using, for example, network sockets. A transport protocol such as TCP/IP layer 112 implements the Transport Control Protocol/Internet Protocol communication with the system 100 that can be used by the messaging layer 106 to send messages over connections to the system 100. Other communication protocols are possible including, for example, User Datagram Protocol (UDP). In further implementations, an optional Transport Layer Security (TLS) layer 110 can be employed to ensure the confidentiality of the messages.

Figure 2:
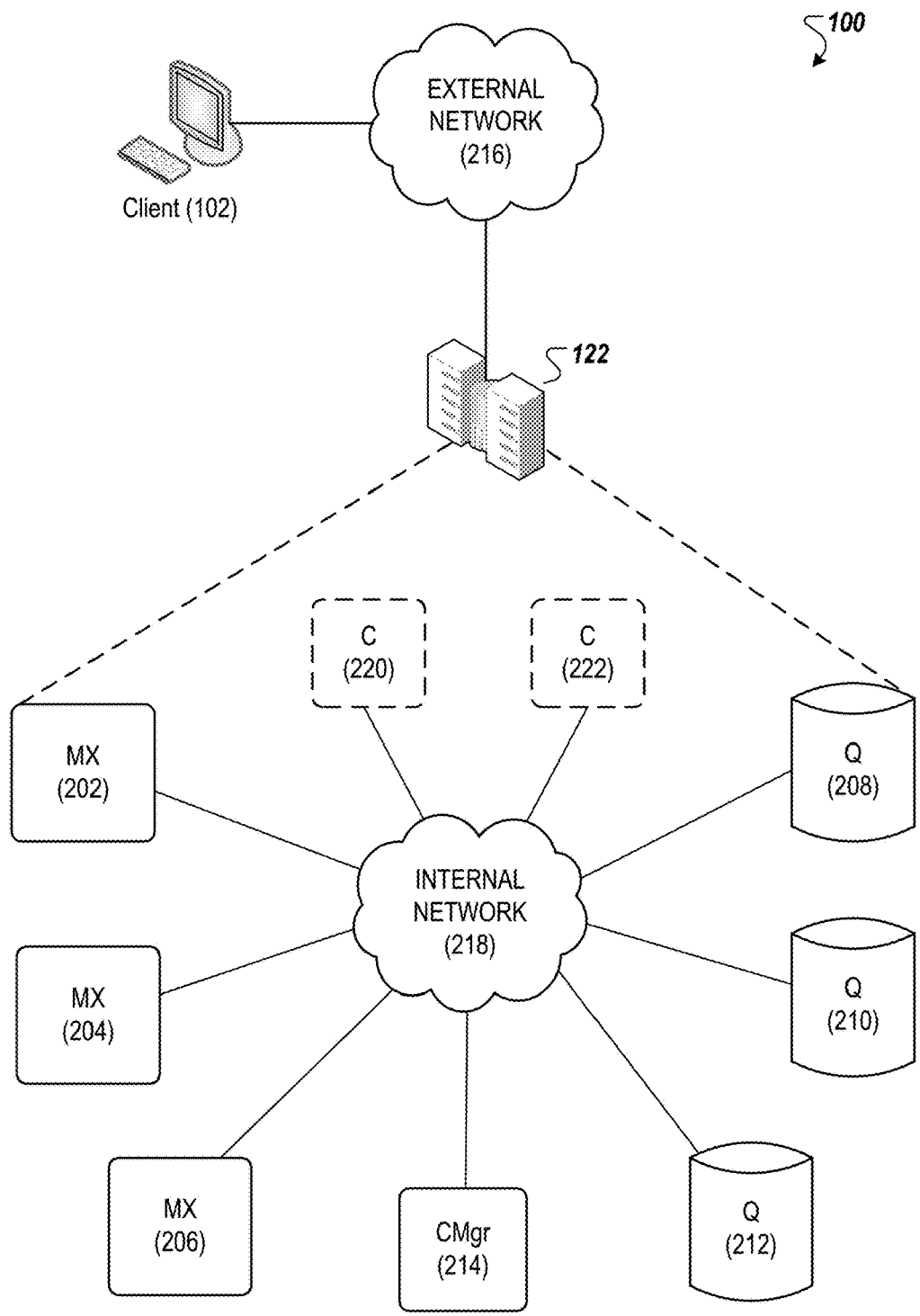
FIG. 2 is a diagram of an example messaging system.

FIG. 2 is a diagram of an example messaging system 100. The system 100 provides functionality for implementing PubSub communication patterns. The system comprises software components and storage that can be deployed at one or more data centers 122 in one or more geographic locations, for example. The system comprises MX nodes (e.g., MX nodes or multiplexer nodes 202, 204 and 206), Q nodes (e.g., Q nodes or queue nodes 208, 210 and 212), one or more configuration manager nodes (e.g., configuration manager 214), and optionally one or more C nodes (e.g., C nodes or cache nodes 220 and 222). Each node can execute in a virtual machine or on a physical machine (e.g., a data processing apparatus). Each MX node can serve as a termination point for one or more publisher and/or subscriber connections through the external network 216. The internal communication among MX nodes, Q nodes, C nodes, and the configuration manager can be conducted over an internal network 218, for example. By way of illustration, MX node 204 can be the terminus of a subscriber connection from client 102. Each Q node buffers channel data for consumption by the MX nodes. An ordered sequence of messages published to a channel is a logical channel stream. For example, if three clients publish messages to a given channel, the combined messages published by the clients comprise a channel stream. Messages can be ordered in a channel stream, for example, by time of publication by the client, by time of receipt by an MX node, or by time of receipt by a Q node. Other ways for ordering messages in a channel stream are possible. In the case where more than one message would be assigned to the same position in the order, one of the messages can be chosen (e.g., randomly) to have a later sequence in the order. Each configuration manager node is responsible for managing Q node load, for example, by assigning channels to Q nodes and/or splitting channel streams into so-called streamlets. Streamlets are discussed further below. The optional C nodes provide caching and load removal from the Q nodes.

In the example messaging system 100, one or more client devices (publishers and/or subscribers) establish respective persistent connections (e.g., TCP connections) to an MX node (e.g., MX node 204). The MX node serves as a termination point for these connections. For instance, external messages (e.g., between respective client devices and the MX node) carried by these connections can be encoded based on an external protocol (e.g., JSON). The MX node terminates the external protocol and translates the external messages to internal communication, and vice versa. The MX nodes publish and subscribe to streamlets on behalf of clients. In this way, an MX node can multiplex and merge requests of client devices subscribing for or publishing to the same channel, thus representing multiple client devices as one, instead of one by one.

In the example messaging system 100, a Q node (e.g., Q node 208) can store one or more streamlets of one or more channel streams. A streamlet is a data buffer for a portion of a channel stream. A streamlet will close to writing when its storage is full. A streamlet will close to reading and writing and be de-allocated when its time-to-live (TTL) has expired. By way of illustration, a streamlet can have a maximum size of 1 MB and a TTL of three minutes. Different channels can have streamlets limited by different sizes and/or by different TTLs. For instance, streamlets in one channel can exist for up to three minutes, while streamlets in another channel can exist for up to 10 minutes. In various implementations, a streamlet corresponds to a computing process running on a Q node. The computing process can be terminated after the streamlet's TTL has expired, thus freeing up computing resources (for the streamlet) back to the Q node, for example.

When receiving a publish request from a client device, an MX node (e.g., MX node 204) makes a request to a configuration manager (e.g., configuration manager 214) to grant access to a streamlet to write the message being published. Note, however, that if the MX node has already been granted write access to a streamlet for the channel (and the channel has not been closed to writing), the MX node can write the message to that streamlet without having to request a grant to access the streamlet. Once a message is written to a streamlet for a channel, the message can be read by MX nodes and provided to subscribers of that channel.

Similarly, when receiving a channel subscription request from a client device, an MX node makes a request to a configuration manager to grant access to a streamlet for the channel from which messages are read. If the MX node has already been granted read access to a streamlet for the channel (and the channel's TTL has not been closed to reading), the MX node can read messages from the streamlet without having to request a grant to access the streamlet. The read messages can then be forwarded to client devices that have subscribed to the channel. In various implementations, messages read from streamlets are cached by MX nodes so that MX nodes can reduce the number of times needed to read from the streamlets.

By way of illustration, an MX node can request a grant from the configuration manager that allows the MX node to store a block of data into a streamlet on a particular Q node that stores streamlets of the particular channel. Example streamlet grant request and grant data structures are as follows:

```
StreamletGrantRequest = {
    "channel": string( )
    "mode": "read" | "write"
    "position": 0
}
StreamletGrantResponse = {
    "streamlet-id": "abcdef82734987",
    "limit-size": 2000000, # 2 megabytes max
    "limit-msgs": 5000, # 5 thousand messages max
    "limit-life": 4000, # the grant is valid for 4 seconds
    "q-node": string( )
    "position": 0
}
```

The StreamletGrantRequest data structure stores the name of the stream channel and a mode indicating whether the MX node intends on reading from or writing to the streamlet. The MX node sends the StreamletGrantRequest to a configuration manager node. The configuration manager node, in response, sends the MX node a StreamletGrantResponse data structure. The StreamletGrantResponse contains an identifier of the streamlet (streamlet-id), the maximum size of the streamlet (limit-size), the maximum number of messages that the streamlet can store (limit-msgs), the TTL (limit-life), and an identifier of a Q node (q-node) on which the streamlet resides. The StreamletGrantRequest and StreamletGrantResponse can also have a position field that points to a position in a streamlet (or a position in a channel) for reading from the streamlet.

A grant becomes invalid once the streamlet has closed. For example, a streamlet is closed to reading and writing once the streamlet's TTL has expired and a streamlet is closed to writing when the streamlet's storage is full. When a grant becomes invalid, the MX node can request a new grant from the configuration manager to read from or write to a streamlet. The new grant will reference a different streamlet and will refer to the same or a different Q node depending on where the new streamlet resides.

Figure 3A:
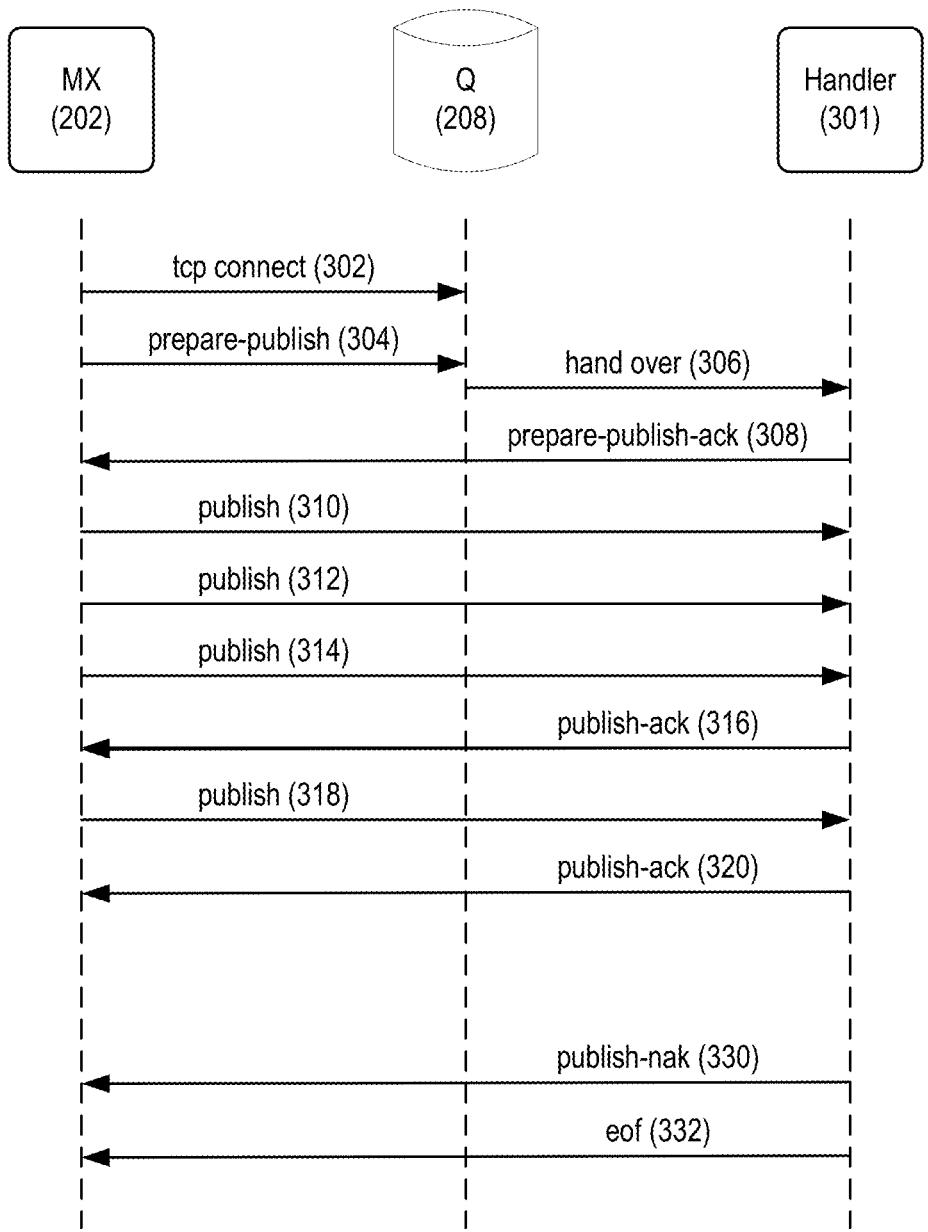
FIG. 3A is a data flow diagram of an example method for writing data to a streamlet.

FIG. 3A is a data flow diagram of an example method for writing data to a streamlet in various embodiments. In FIG. 3A, when an MX node (e.g., MX node 202) request to write to a streamlet is granted by a configuration manager (e.g., configuration manager 214), as described before, the MX node establishes a Transmission Control Protocol (TCP) connection with the Q node (e.g., Q node 208) identified in the grant response received from the configuration manager (302). A streamlet can be written concurrently by multiple write grants (e.g., for messages published by multiple publisher clients). Other types of connection protocols between the MX node and the Q node are possible.

The MX node then sends a prepare-publish message with an identifier of a streamlet that the MX node wants to write to the Q node (304). The streamlet identifier and Q node identifier can be provided by the configuration manager in the write grant as described earlier. The Q node hands over the message to a handler process 301 (e.g., a computing process running on the Q node) for the identified streamlet (306). The handler process can send to the MX node an acknowledgement (308). After receiving the acknowledgement, the MX node starts writing (publishing) messages (e.g., 310, 312, 314, and 318) to the handler process, which in turn stores the received data in the identified streamlet. The handler process can also send acknowledgements (316, 320) to the MX node for the received data. In some implementations, acknowledgements can be piggy-backed or cumulative. For instance, the handler process can send to the MX node an acknowledgement for every predetermined amount of data received (e.g., for every 100 messages received) or for every predetermined time period (e.g., for every one millisecond). Other acknowledgement scheduling algorithms, such as Nagle's algorithm, can be used.

If the streamlet can no longer accept published data (e.g., when the streamlet is full), the handler process sends a Negative-Acknowledgement (NAK) message (330) indicating a problem, following by an EOF (end-of-file) message (332). In this way, the handler process closes the association with the MX node for the publish grant. The MX node can then request a write grant for another streamlet from a configuration manager if the MX node has additional messages to store.

Figure 3B:
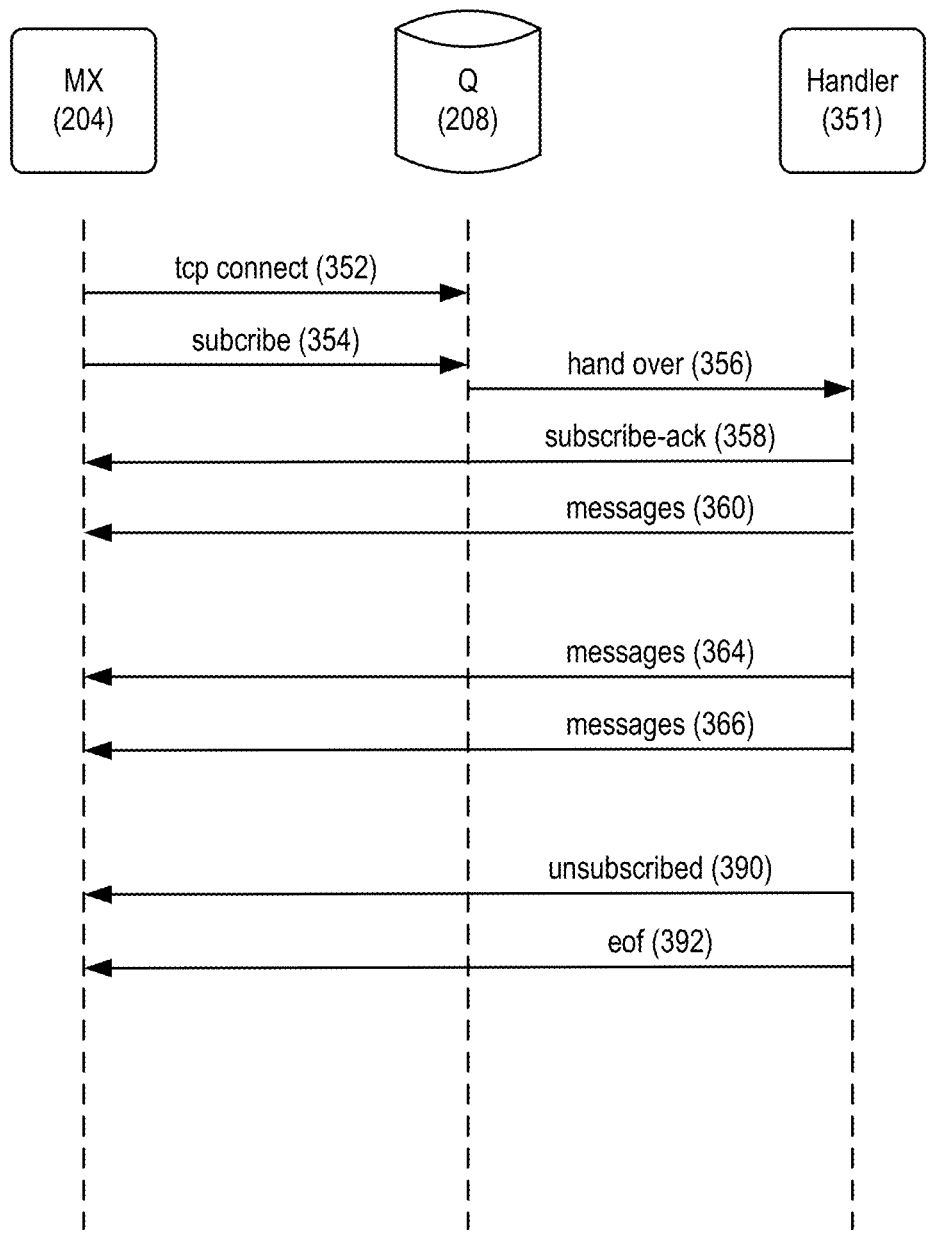
FIG. 3B is a data flow diagram of an example method for reading data from a streamlet.

FIG. 3B is a data flow diagram of an example method for reading data from a streamlet in various embodiments. In FIG. 3B, an MX node (e.g., MX node 204) sends to a configuration manager (e.g., configuration manager 214) a request for reading a particular channel starting from a particular message or time offset in the channel. The configuration manager returns to the MX node a read grant including an identifier of a streamlet containing the particular message, a position in the streamlet corresponding to the particular message, and an identifier of a Q node (e.g., Q node 208) containing the particular streamlet. The MX node then establishes a TCP connection with the Q node (352). Other types of connection protocols between the MX node and the Q node are possible.

The MX node then sends to the Q node a subscribe message (354) with the identifier of the streamlet (in the Q node) and the position in the streamlet from which the MX node wants to read (356). The Q node hands over the subscribe message to a handler process 351 for the streamlet (356). The handler process can send to the MX node an acknowledgement (358). The handler process then sends messages (360, 364, 366), starting at the position in the streamlet, to the MX node. In some implementations, the handler process can send all of the messages in the streamlet to the MX node. After sending the last message in a particular streamlet, the handler process can send a notification of the last message to the MX node. The MX node can send to the configuration manager another request for another streamlet containing a next message in the particular channel.

If the particular streamlet is closed (e.g., after its TTL has expired), the handler process can send an unsubscribe message (390), followed by an EOF message (392), to close the association with the MX node for the read grant. The MX node can close the association with the handler process when the MX node moves to another streamlet for messages in the particular channel (e.g., as instructed by the configuration manager). The MX node can also close the association with the handler process if the MX node receives an unsubscribe message from a corresponding client device.

In various implementations, a streamlet can be written into and read from at the same time instance. For example, there can be a valid read grant and a valid write grant at the same time instance. In various implementations, a streamlet can be read concurrently by multiple read grants (e.g., for channels subscribed to by multiple publisher clients). The handler process of the streamlet can order messages from concurrent write grants based on, for example, time-of-arrival, and store the messages based on the order. In this way, messages published to a channel from multiple publisher clients can be serialized and stored in a streamlet of the channel.

In the messaging system 100, one or more C nodes (e.g., C node 220) can offload data transfers from one or more Q nodes. For instance, if there are many MX nodes requesting streamlets from Q nodes for a particular channel, the streamlets can be offloaded and cached in one or more C nodes. The MX nodes (e.g., as instructed by read grants from a configuration manager) can read the streamlets from the C nodes instead.

As described above, messages for a channel in the messaging system 100 are ordered in a channel stream. A configuration manager (e.g., configuration manager 214) splits the channel stream into fixed-sized streamlets that each reside on a respective Q node. In this way, storing a channel stream can be shared among many Q nodes; each Q node stores a portion (one or more streamlets) of the channel stream. More particularly, a streamlet can be stored in, for example, registers and/or dynamic memory elements associated with a computing process on a Q node, thus avoiding the need to access persistent, slower storage devices such as hard disks. This results in faster message access. The configuration manager can also balance load among Q nodes in the messaging system 100 by monitoring respective workloads of the Q nodes and allocating streamlets in a way that avoids overloading any one Q node.

In various implementations, a configuration manager maintains a list identifying each active streamlet, the respective Q node on which the streamlet resides, an identification of the position of the first message in the streamlet, and whether the streamlet is closed for writing. In some implementations, Q nodes notify the configuration manager and/or any MX nodes that are publishing to a streamlet that the streamlet is closed due to being full or when the streamlet's TTL has expired. When a streamlet is closed, the streamlet remains on the configuration manager's list of active streamlets until the streamlet's TTL has expired so that MX nodes can continue to retrieve messages from the streamlet.

When an MX node requests a write grant for a given channel and there is not a streamlet for the channel that can be written to, the configuration manager allocates a new streamlet on one of the Q nodes and returns the identity of the streamlet and the Q node in the StreamletGrantResponse. Otherwise, the configuration manager returns the identity of the currently open for writing streamlet and corresponding Q node in the StreamletGrantResponse. MX nodes can publish messages to the streamlet until the streamlet is full or the streamlet's TTL has expired, after which a new streamlet can be allocated by the configuration manager.

When an MX node requests a read grant for a given channel and there is not a streamlet for the channel that can be read from, the configuration manager allocates a new streamlet on one of the Q nodes and returns the identity of the streamlet and the Q node in the StreamletGrantResponse. Otherwise, the configuration manager returns the identity of the streamlet and Q node that contains the position from which the MX node wishes to read. The Q node can then begin sending messages to the MX node from the streamlet beginning at the specified position until there are no more messages in the streamlet to send. When a new message is published to a streamlet, MX nodes that have subscribed to that streamlet will receive the new message. If a streamlet's TTL has expired, the handler process 351 can send an EOF message (392) to any MX nodes that are subscribed to the streamlet.

In some implementations, the messaging system 100 can include multiple configuration managers (e.g., configuration manager 214 plus one or more other configuration managers). Multiple configuration managers can provide resiliency and prevent single point of failure. For instance, one configuration manager can replicate lists of streamlets and current grants it maintains to another "slave" configuration manager. As another example, multiple configuration managers can coordinate operations between them using distributed consensus protocols, such as, for example, Paxos or Raft protocols.

Figure 4A:
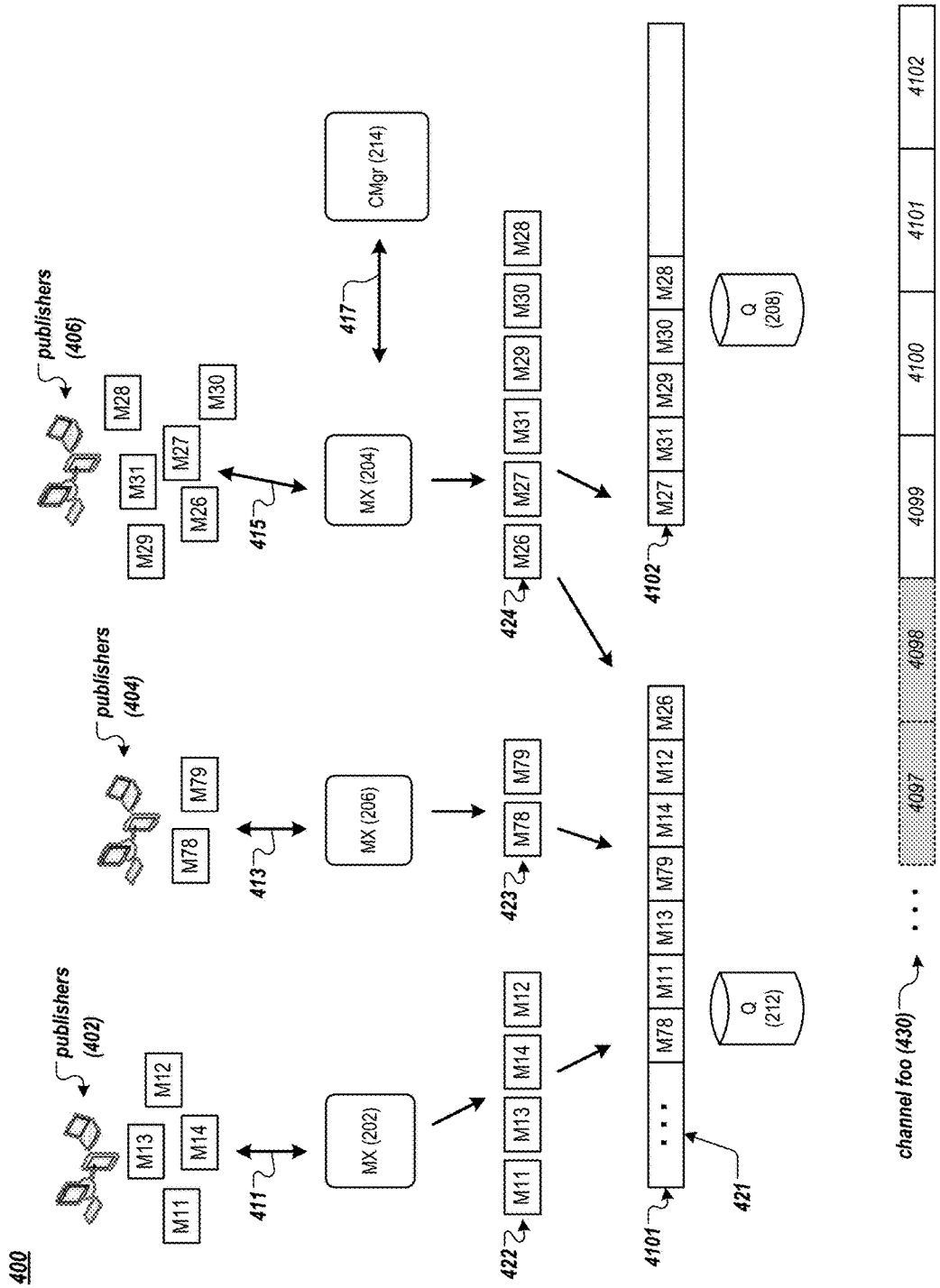
FIG. 4A is a data flow diagram of an example method for publishing messages to a channel of a messaging system.

FIG. 4A is a data flow diagram of an example method for publishing messages to a channel of a messaging system. In FIG. 4A, publishers (e.g., publisher clients 402, 404, 406) publish messages to the messaging system 100 described earlier in reference to FIG. 2. For instance, publishers 402 respectively establish connections 411 and send publish requests to the MX node 202. Publishers 404 respectively establish connections 413 and send publish requests to the MX node 206. Publishers 406 respectively establish connections 415 and send publish requests to the MX node 204. Here, the MX nodes can communicate (417) with a configuration manager (e.g., configuration manager 214) and one or more Q nodes (e.g., Q nodes 212 and 208) in the messaging system 100 via the internal network 218.

By way of illustration, each publish request (e.g., in JSON key/value pairs) from a publisher to an MX node includes a channel name and a message. The MX node (e.g., MX node 202) can assign the message in the publish request to a distinct channel in the messaging system 100 based on the channel name (e.g., "foo") of the publish request. The MX node can confirm the assigned channel with the configuration manager 214. If the channel (specified in the subscribe request) does not yet exist in the messaging system 100, the configuration manager can create and maintain a new channel in the messaging system 100. For instance, the configuration manager can maintain a new channel by maintaining a list identifying each active streamlet of the channel's stream, the respective Q node on which the streamlet resides, and identification of the positions of the first and last messages in the streamlet as described earlier.

For messages of a particular channel, the MX node can store the messages in one or more buffers or streamlets in the messaging system 100. For instance, the MX node 202 receives from the publishers 402 requests to publish messages M11, M12, M13, and M14 to a channel foo. The MX node 206 receives from the publishers 404 requests to publish messages M78 and M79 to the channel foo. The MX node 204 receives from the publishers 406 requests to publish messages M26, M27, M28, M29, M30, and M31 to the channel foo.

The MX nodes can identify one or more streamlets for storing messages for the channel foo. As described earlier, each MX node can request a write grant from the configuration manager 214 that allows the MX node to store the messages in a streamlet of the channel foo. For instance, the MX node 202 receives a grant from the configuration manager 214 to write messages M11, M12, M13, and M14 to a streamlet 4101 on the Q node 212. The MX node 206 receives a grant from the configuration manager 214 to write messages M78 and M79 to the streamlet 4101. Here, the streamlet 4101 is the last one (at the moment) of a sequence of streamlets of the channel stream 430 storing messages of the channel foo. The streamlet 4101 has messages (421) of the channel foo that were previously stored in the streamlet 4101, but is still open, i.e., the streamlet 4101 still has space for storing more messages and the streamlet's TTL has not expired.

The MX node 202 can arrange the messages for the channel foo based on the respective time that each message was received by the MX node 202, e.g., M11, M13, M14, M12 (422), and store the received messages as arranged in the streamlet 4101. That is, the MX node 202 receives M11 first, followed by M13, M14, and M12. Similarly, the MX node 206 can arrange the messages for the channel foo based on their respective time that each message was received by the MX node 206, e.g., M78, M79 (423), and store the received messages as arranged in the streamlet 4101. Other arrangements or ordering of the messages for the channel are possible.

The MX node 202 (or MX node 206) can store the received messages using the method for writing data to a streamlet described earlier in reference to FIG. 3A, for example. In various implementations, the MX node 202 (or MX node 206) can buffer (e.g., in a local data buffer) the received messages for the channel foo and store the received messages in a streamlet for the channel foo (e.g., streamlet 4101) when the buffered messages reach a predetermined number or size (e.g., 100 messages) or when a predetermined time (e.g., 50 milliseconds) has elapsed. For instance, the MX node 202 can store in the streamlet 100 messages at a time or in every 50 milliseconds. Other appropriate algorithms and techniques, such as Nagle's algorithm, can be used for managing the buffered messages.

In various implementations, the Q node 212 (e.g., a handler process) stores the messages of the channel foo in the streamlet 4101 in the order as arranged by the MX node 202 and MX node 206. The Q node 212 stores the messages of the channel foo in the streamlet 4101 in the order the Q node 212 receives the messages. For instance, assume that the Q node 212 receives M78 (from the MX node 206) first, followed by messages M11 and M13 (from the MX node 202), M79 (from the MX node 206), and M14 and M12 (from the MX node 202). The Q node 212 stores in the streamlet 4101 the messages in the order as received, e.g., M78, M11, M13, M79, M14, and M12, immediately after the messages 421 that are already stored in the streamlet 4101. In this way, messages published to the channel foo from multiple publishers (e.g., 402, 404) can be serialized in a particular order and stored in the streamlet 4101 of the channel foo. Different subscribers that subscribe to the channel foo will receive messages of the channel foo in the same particular order, as will be described in more detail in reference to FIG. 4B.

In the example of FIG. 4A, at a time instance after the message M12 was stored in the streamlet 4101, the MX node 204 requests a grant from the configuration manager 214 to write to the channel foo. The configuration manager 214 provides the MX node 204 a grant to write messages to the streamlet 4101, as the streamlet 4101 is still open for writing. The MX node 204 arranges the messages for the channel foo based on the respective time that each message was received by the MX node 204, e.g., M26, M27, M31, M29, M30, M28 (424), and stores the messages as arranged for the channel foo.

By way of illustration, assume that the message M26 is stored to the last available position of the streamlet 4101. As the streamlet 4101 is now full, the Q node 212 sends to the MX node 204 a NAK message, following by an EOF message, to close the association with the MX node 204 for the write grant, as described earlier in reference to FIG. 3A. The MX node 204 then requests another write grant from the configuration manager 214 for additional messages (e.g., M27, M31, and so on) for the channel foo.

The configuration manager 214 can monitor available Q nodes in the messaging system 100 for their respective workloads (e.g., how many streamlets are residing in each Q node). The configuration manager 214 can allocate a streamlet for the write request from the MX node 204 such that overloading (e.g., too many streamlets or too many read or write grants) can be avoided for any given Q node. For instance, the configuration manager 214 can identify a least loaded Q node in the messaging system 100 and allocate a new streamlet on the least loaded Q node for write requests from the MX node 204. In the example of FIG. 4A, the configuration manager 214 allocates a new streamlet 4102 on the Q node 208 and provides a write grant to the MX node 204 to write messages for the channel foo to the streamlet 4102. As shown in FIG. 4A, the Q node stores in the streamlet 4102 the messages from the MX node 204 in an order as arranged by the MX node 204: M27, M31, M29, M30, and M28 (assuming that there is no other concurrent write grant for the streamlet 4102 at the moment).

When the configuration manager 214 allocates a new streamlet (e.g., streamlet 4102) for a request for a grant from an MX node (e.g., MX node 204) to write to a channel (e.g., foo), the configuration manager 214 assigns to the streamlet its TTL, which will expire after TTLs of other streamlets that are already in the channel's stream. For instance, the configuration manager 214 can assign to each streamlet of the channel foo's channel stream a TTL of 3 minutes when allocating the streamlet. That is, each streamlet will expire 3 minutes after it is allocated (created) by the configuration manager 214. Since a new streamlet is allocated after a previous streamlet is closed (e.g., filled entirely or expired), in this way, the channel foo's channel stream comprises streamlets that each expires sequentially after its previous streamlet expires. For instance, as shown in an example channel stream 430 of the channel foo in FIG. 4A, streamlet 4098 and streamlets before 4098 have expired (as indicated by the dotted-lined gray-out boxes). Messages stored in these expired streamlets are not available for reading for subscribers of the channel foo. Streamlets 4099, 4100, 4101, and 4102 are still active (not expired). The streamlets 4099, 4100, and 4101 are closed for writing, but still are available for reading. The streamlet 4102 is available for reading and writing, at the moment when the message M28 was stored in the streamlet 4102. At a later time, the streamlet 4099 will expire, following by the streamlets 4100, 4101, and so on.

Figure 4B:
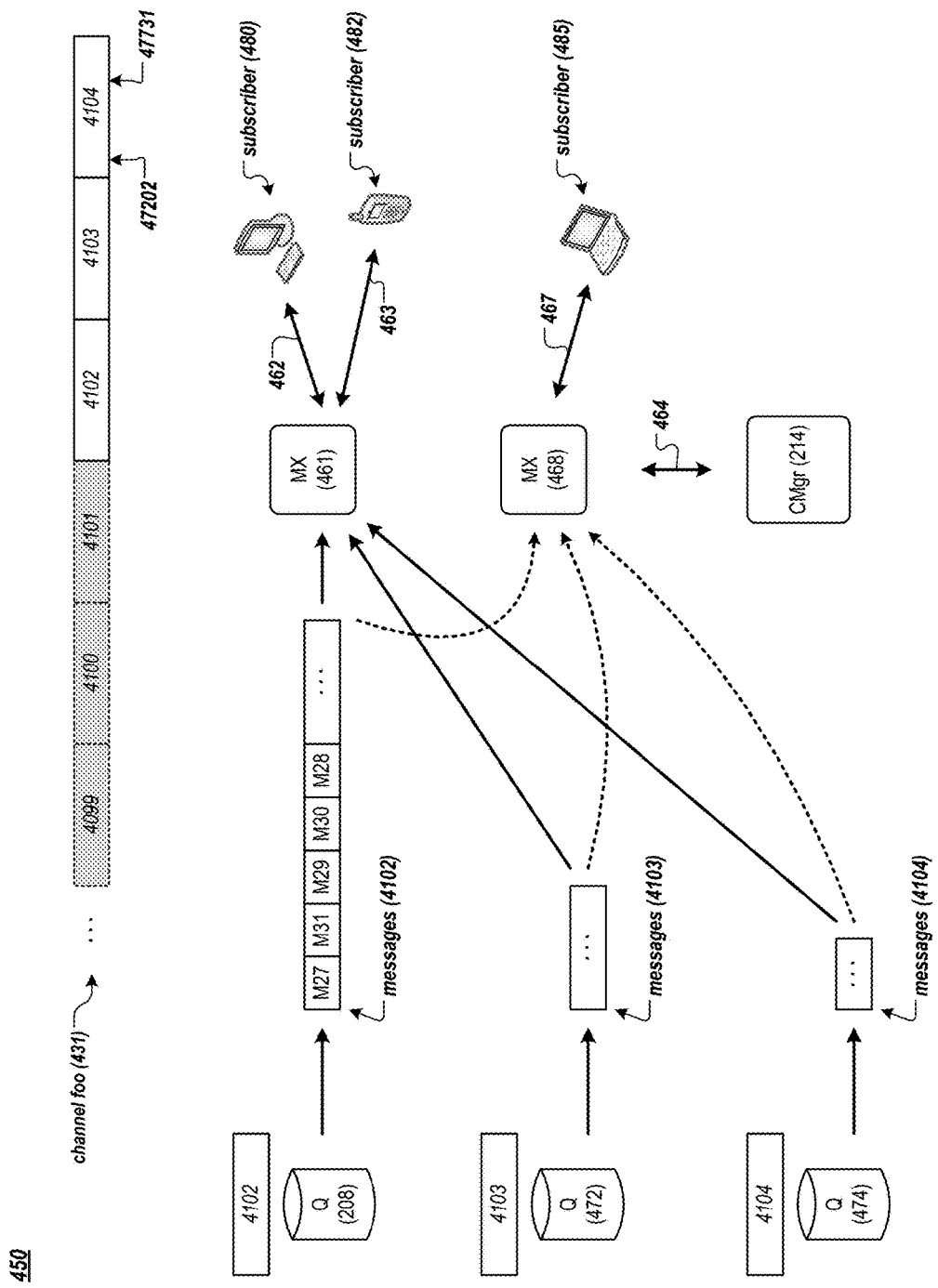
FIG. 4B is a data flow diagram of an example method for subscribing to a channel of a messaging system.

FIG. 4B is a data flow diagram of an example method for subscribing to a channel of a messaging system. In FIG. 4B, a subscriber 480 establishes a connection 462 with an MX node 461 of the messaging system 100. Subscriber 482 establishes a connection 463 with the MX node 461. Subscriber 485 establishes a connection 467 with an MX node 468 of the messaging system 100. Here, the MX nodes 461 and 468 can respectively communicate (464) with the configuration manager 214 and one or more Q nodes in the messaging system 100 via the internal network 218.

A subscriber (e.g., subscriber 480) can subscribe to the channel foo of the messaging system 100 by establishing a connection (e.g., 462) and sending a request for subscribing to messages of the channel foo to an MX node (e.g., MX node 461). The request (e.g., in JSON key/value pairs) can include a channel name, such as, for example, "foo." When receiving the subscribe request, the MX node 461 can send to the configuration manager 214 a request for a read grant for a streamlet in the channel foo's channel stream.

By way of illustration, assume that at the current moment the channel foo's channel stream 431 includes active streamlets 4102, 4103, and 4104, as shown in FIG. 4B. The streamlets 4102 and 4103 each are full. The streamlet 4104 stores messages of the channel foo, including the last message (at the current moment) stored at a position 47731. Streamlets 4101 and streamlets before 4101 are invalid, as their respective TTLs have expired. Note that the messages M78, M11, M13, M79, M14, M12, and M26 stored in the streamlet 4101, described earlier in reference to FIG. 4A, are no longer available for subscribers of the channel foo, since the streamlet 4101 is no longer valid, as its TTL has expired. As described earlier, each streamlet in the channel foo's channel stream has a TTL of 3 minutes, thus only messages (as stored in streamlets of the channel foo) that are published to the channel foo (i.e., stored into the channel's streamlets) no earlier than 3 minutes from the current time can be available for subscribers of the channel foo.

The MX node 461 can request a read grant for all available messages in the channel foo, for example, when the subscriber 480 is a new subscriber to the channel foo. Based on the request, the configuration manager 214 provides the MX node 461 a read grant to the streamlet 4102 (on the Q node 208) that is the earliest streamlet in the active streamlets of the channel foo (i.e., the first in the sequence of the active streamlets). The MX node 461 can retrieve messages in the streamlet 4102 from the Q node 208, using the method for reading data from a streamlet described earlier in reference to FIG. 3B, for example. Note that the messages retrieved from the streamlet 4102 maintain the same order as stored in the streamlet 4102. However, other arrangements or ordering of the messages in the streamlet are possible. In various implementations, when providing messages stored in the streamlet 4102 to the MX node 461, the Q node 208 can buffer (e.g., in a local data buffer) the messages and send the messages to the MX node 461 when the buffer messages reach a predetermined number or size (e.g., 200 messages) or a predetermined time (e.g., 50 milliseconds) has elapsed. For instance, the Q node 208 can send the channel foo's messages (from the streamlet 4102) to the MX node 461 200 messages at a time or in every 50 milliseconds. Other appropriate algorithms and techniques, such as Nagle's algorithm, can be used for managing the buffered messages.

After receiving the last message in the streamlet 4102, the MX node 461 can send an acknowledgement to the Q node 208, and send to the configuration manager 214 another request (e.g., for a read grant) for the next streamlet in the channel stream of the channel foo. Based on the request, the configuration manager 214 provides the MX node 461 a read grant to the streamlet 4103 (on Q node 472) that logically follows the streamlet 4102 in the sequence of active streamlets of the channel foo. The MX node 461 can retrieve messages stored in the streamlet 4103, e.g., using the method for reading data from a streamlet described earlier in reference to FIG. 3B, until it retrieves the last message stored in the streamlet 4103. The MX node 461 can send to the configuration manager 214 yet another request for a read grant for messages in the next streamlet 4104 (on Q node 474). After receiving the read grant, the MX node 461 retrieves messages of the channel foo stored in the streamlet 4104, until the last message at the position 47731. Similarly, the MX node 468 can retrieve messages from the streamlets 4102, 4103, and 4104 (as shown with dotted arrows in FIG. 4B), and provide the messages to the subscriber 485.

The MX node 461 can send the retrieved messages of the channel foo to the subscriber 480 (via the connection 462) while receiving the messages from the Q nodes 208, 472, or 474. In various implementations, the MX node 461 can store the retrieved messages in a local buffer. In this way, the retrieved messages can be provided to another subscriber (e.g., subscriber 482) when the other subscriber subscribes to the channel foo and requests the channel's messages. The MX node 461 can remove messages stored in the local buffer that each has a time of publication that has exceeded a predetermined time period. For instance, the MX node 461 can remove messages (stored in the local buffer) with respective times of publication exceeding 3 minutes. In some implementations, the predetermined time period for keeping messages in the local buffer on MX node 461 can be the same as or similar to the time-to-live duration of a streamlet in the channel foo's channel stream, since at a given moment, messages retrieved from the channel's stream do not include those in streamlets having respective times-to-live that had already expired.

The messages retrieved from the channel stream 431 and sent to the subscriber 480 (by the MX node 461) are arranged in the same order as the messages were stored in the channel stream, although other arrangements or ordering of the messages are possible. For instance, messages published to the channel foo are serialized and stored in the streamlet 4102 in a particular order (e.g., M27, M31, M29, M30, and so on), then stored subsequently in the streamlet 4103 and the streamlet 4104. The MX node retrieves messages from the channel stream 431 and provides the retrieved messages to the subscriber 480 in the same order as the messages are stored in the channel stream: M27, M31, M29, M30, and so on, followed by ordered messages in the streamlet 4103, and followed by ordered messages in the streamlet 4104.

Instead of retrieving all available messages in the channel stream 431, the MX node 461 can request a read grant for messages stored in the channel stream 431 starting from a message at particular position, e.g., position 47202. For instance, the position 47202 can correspond to an earlier time instance (e.g., 10 seconds before the current time) when the subscriber 480 was last subscribing to the channel foo (e.g., via a connection to the MX node 461 or another MX node of the messaging system 100). The MX node 461 can send to the configuration manager 214 a request for a read grant for messages starting at the position 47202. Based on the request, the configuration manager 214 provides the MX node 461 a read grant to the streamlet 4104 (on the Q node 474) and a position on the streamlet 4104 that corresponds to the channel stream position 47202. The MX node 461 can retrieve messages in the streamlet 4104 starting from the provided position, and send the retrieved messages to the subscriber 480.

As described above in reference to FIGS. 4A and 4B, messages published to the channel foo are serialized and stored in the channel's streamlets in a particular order. The configuration manager 214 maintains the ordered sequence of streamlets as they are created throughout their respective times-to-live. Messages retrieved from the streamlets by an MX node (e.g., MX node 461, or MX node 468) and provided to a subscriber can be, in some implementations, in the same order as the messages are stored in the ordered sequence of streamlets. In this way, messages sent to different subscribers (e.g., subscriber 480, subscriber 482, or subscriber 485) can be in the same order (as the messages are stored in the streamlets), regardless which MX nodes the subscribers are connected to.

In various implementations, a streamlet stores messages in a set of blocks of messages. Each block stores a number of messages. For instance, a block can store two hundred kilobytes of messages (although other sizes of blocks of messages are possible). Each block has its own time-to-live, which can be shorter than the time-to-live of the streamlet holding the block. Once a block's TTL has expired, the block can be discarded from the streamlet holding the block, as described in more detail below in reference to FIG. 4C.

Figure 4C:
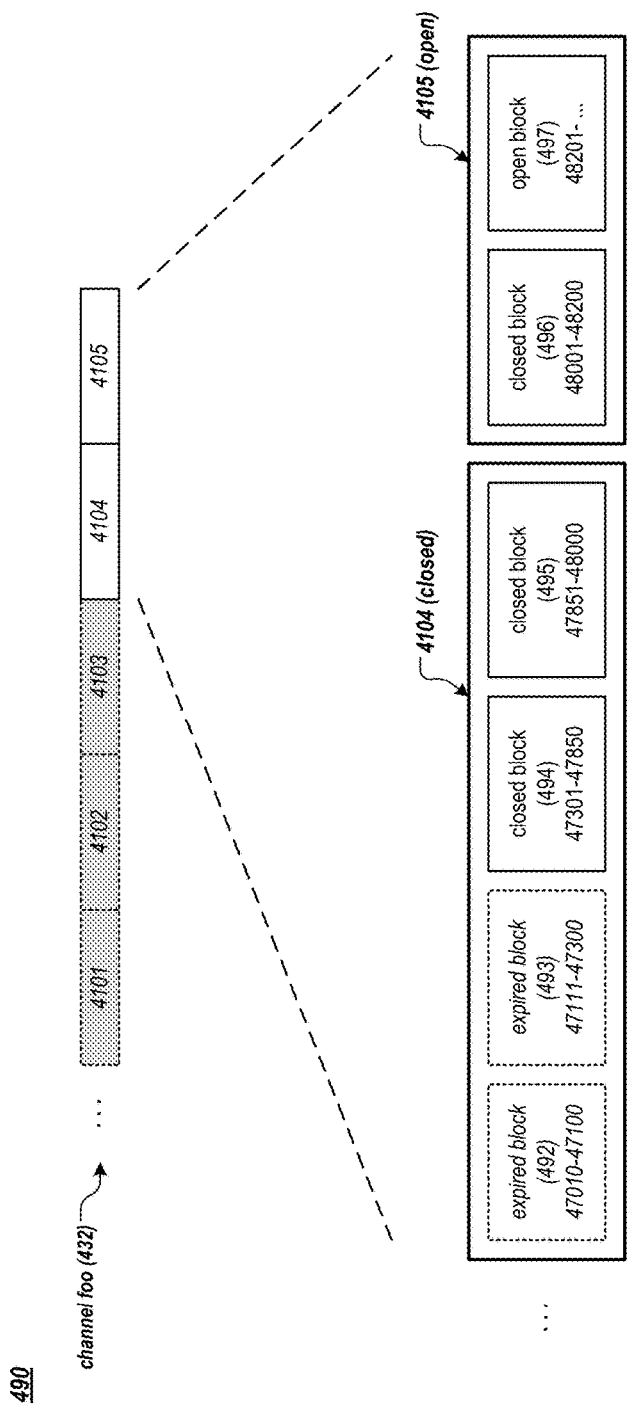
FIG. 4C is an example data structure for storing messages of a channel of a messaging system.

FIG. 4C is an example data structure for storing messages of a channel of a messaging system. As described with the channel foo in reference to FIGS. 4A and 4B, assume that at the current moment the channel foo's channel stream 432 includes active streamlets 4104 and 4105, as shown in FIG. 4C. Streamlet 4103 and streamlets before 4103 are invalid, as their respective TTLs have expired. The streamlet 4104 is already full for its capacity (e.g., as determined by a corresponding write grant) and is closed for additional message writes. The streamlet 4104 is still available for message reads. The streamlet 4105 is open and is available for message writes and reads.

By way of illustration, the streamlet 4104 (e.g., a computing process running on the Q node 474 shown in FIG. 4B) currently holds two blocks of messages. Block 494 holds messages from channel positions 47301 to 47850. Block 495 holds messages from channel positions 47851 to 48000. The streamlet 4105 (e.g., a computing process running on another Q node in the messaging system 100) currently holds two blocks of messages. Block 496 holds messages from channel positions 48001 to 48200. Block 497 holds messages starting from channel position 48201, and still accepts additional messages of the channel foo.

When the streamlet 4104 was created (e.g., by a write grant), a first block (sub-buffer) 492 was created to store messages, e.g., from channel positions 47010 to 47100. Later on, after the block 492 had reached its capacity, another block 493 was created to store messages, e.g., from channel positions 47111 to 47300. Blocks 494 and 495 were subsequently created to store additional messages. Afterwards, the streamlet 4104 was closed for additional message writes, and the streamlet 4105 was created with additional blocks for storing additional messages of the channel foo.

In this example, the respective TTL's of blocks 492 and 493 had expired. The messages stored in these two blocks (from channel positions 47010 to 47300) are no longer available for reading by subscribers of the channel foo. The streamlet 4104 can discard these two expired blocks, e.g., by de-allocating the memory space for the blocks 492 and 493. The blocks 494 or 495 could become expired and be discarded by the streamlet 4104, before the streamlet 4104 itself becomes invalid. Alternatively, streamlet 4104 itself could become invalid before the blocks 494 or 495 become expired. In this way, a streamlet can hold one or more blocks of messages, or contain no block of messages, depending on respective TTLs of the streamlet and blocks, for example.

A streamlet, or a computing process running on a Q node in the messaging system 100, can create a block for storing messages of a channel by allocating a certain size of memory space from the Q node. The streamlet can receive, from an MX node in the messaging system 100, one message at a time and store the received message in the block. Alternatively, the MX node can assemble (i.e., buffer) a group of messages and send the group of messages to the Q node. The streamlet can allocate a block of memory space (from the Q node) and store the group of messages in the block. The MX node can also perform compression on the group of messages, e.g., by removing a common header from each message or performing other suitable compression techniques.

As described above, a streamlet (a data buffer) residing on a Q node stores messages of a channel in the messaging system 100. To prevent failure of the Q node (a single point failure) that can cause messages being lost, the messaging system 100 can replicate messages on multiple Q nodes, as described in more detail below.

Figure 5A:
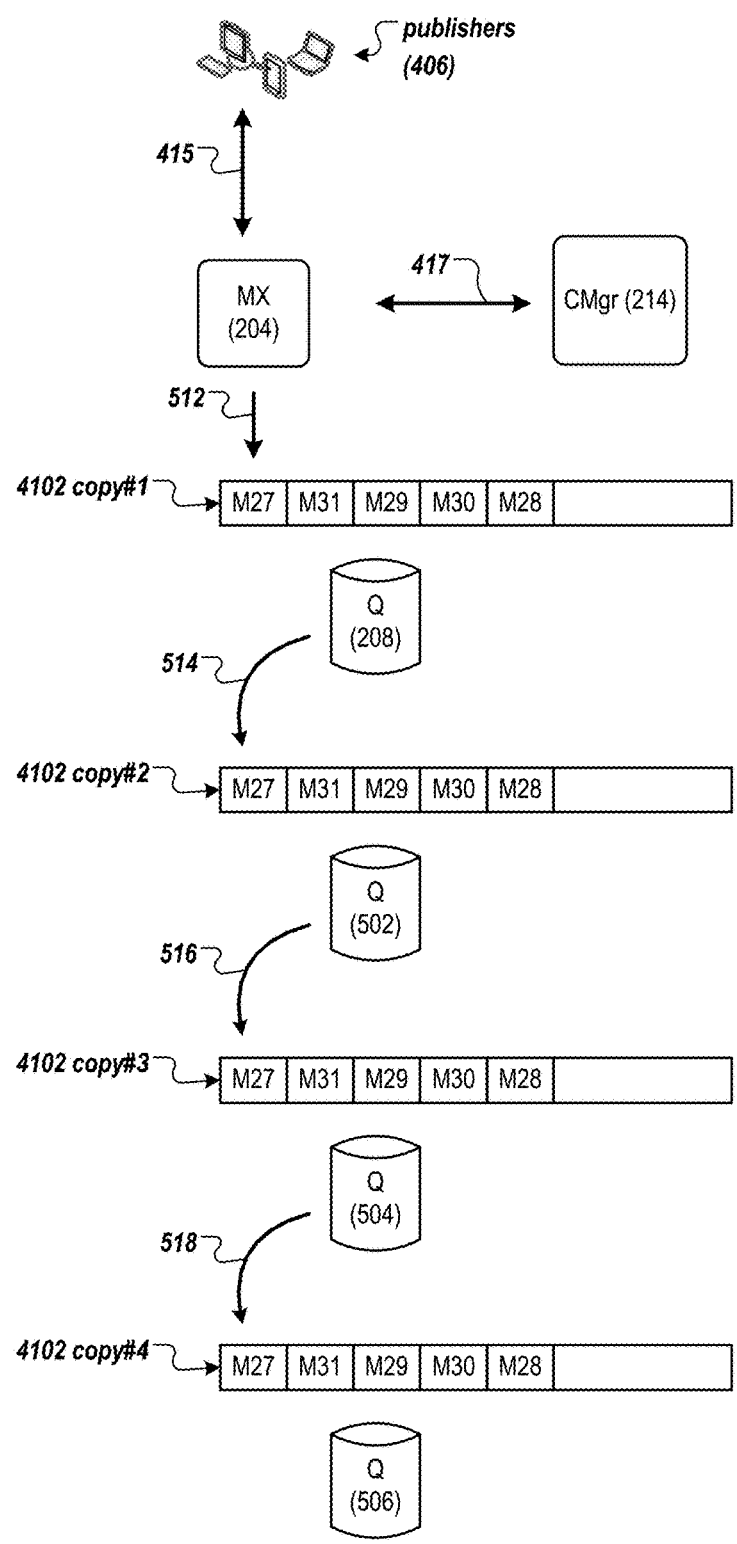
FIG. 5A is a data flow diagram of an example method for publishing and replicating messages of a messaging system.

FIG. 5A is a data flow diagram of an example method 500 for publishing and replicating messages of the messaging system 100. As described earlier in reference to FIG. 4A, the MX node 204 receives messages (of the channel foo) from the publishers 406. The configuration manager 214 can instruct the MX Node 204 (e.g., with a write grant) to store the messages in the streamlet 4102 on the Q node 208. In FIG. 5A, instead of storing the messages on a single node (e.g., Q node 208), the configuration manager 214 allocates multiple Q nodes to store multiple copies of the streamlet 4102 on these Q nodes.

By way of illustration, the configuration manager 214 allocates Q nodes 208, 502, 504, and 506 in the messaging system 100 to store copies of the streamlet 4102. The configuration manager 214 instructs the MX node 204 to transmit the messages for the channel foo (e.g., messages M27, M31, M29, M30, and M28) to the Q node 208 (512). A computing process running on the Q node 208 stores the messages in the first copy (copy #1) of the streamlet 4102. Instead of sending an acknowledgement message to the MX node 204 after storing the messages, the Q node 208 forwards the messages to the Q node 502 (514). A computing process running on the Q node 502 stores the messages in another copy (copy #2) of the streamlet 4102. Meanwhile, the Q node 502 forwards the messages to the Q node 504 (516). A computing process running on the Q node 504 stores the messages in yet another copy (copy #3) of the streamlet 4102. The Q node 504 also forwards the message to the Q node 506 (518). A computing process running on the Q node 506 stores the messages in yet another copy (copy #4) of the streamlet 4102. The Q node 506 can send an acknowledgement message to the MX node 204, indicating that all the messages (M27, M31, M29, M30, and M28) have been stored successfully in streamlet copies #1, #2, #3 and #4.

In some implementations, after successfully storing the last copy (copy #4), the Q node 506 can send an acknowledgement to its upstream Q node (504), which in turns sends an acknowledgement to its upstream Q node (502), and so on, until the acknowledgement is sent to the Q node 208 storing the first copy (copy #1). The Q node 208 can send an acknowledgement message to the MX node 204, indicating that all messages have been stored successfully in the streamlet 4102 (i.e., in the copies #1, #2, #3 and #4).

In this way, four copies of the streamlet 4102 (and each message in the streamlet) are stored in four different Q nodes. Other numbers (e.g., two, three, five, or other suitable number) of copies of a streamlet are also possible. In the present illustration, the four copies form a chain of copies including a head copy in the copy #1 and a tail copy in the copy #4. When a new message is published to the streamlet 4102, the message is first stored in the head copy (copy #1) on the Q node 208. The message is then forwarded downstream to the next adjacent copy, the copy #2 on the Q node 502 for storage, then to the copy #3 on the Q node 504 for storage, until the message is stored in the tail copy the copy #4 on the Q node 506.

In addition to storing and forwarding by messages, the computing processes running on Q nodes that store copies of a streamlet can also store and forward messages by blocks of messages, as described earlier in reference to FIG. 4C. For instance, the computing process storing the copy #1 of the streamlet 4102 on Q node 208 can allocate memory and store a block of, for example, 200 kilobytes of messages (although other sizes of blocks of messages are possible), and forward the block of messages to the next adjacent copy (copy #2) of the chain for storage, and so on, until the block messages is stored in the tail copy (copy #4) on the Q node 506.

Figure 5B:
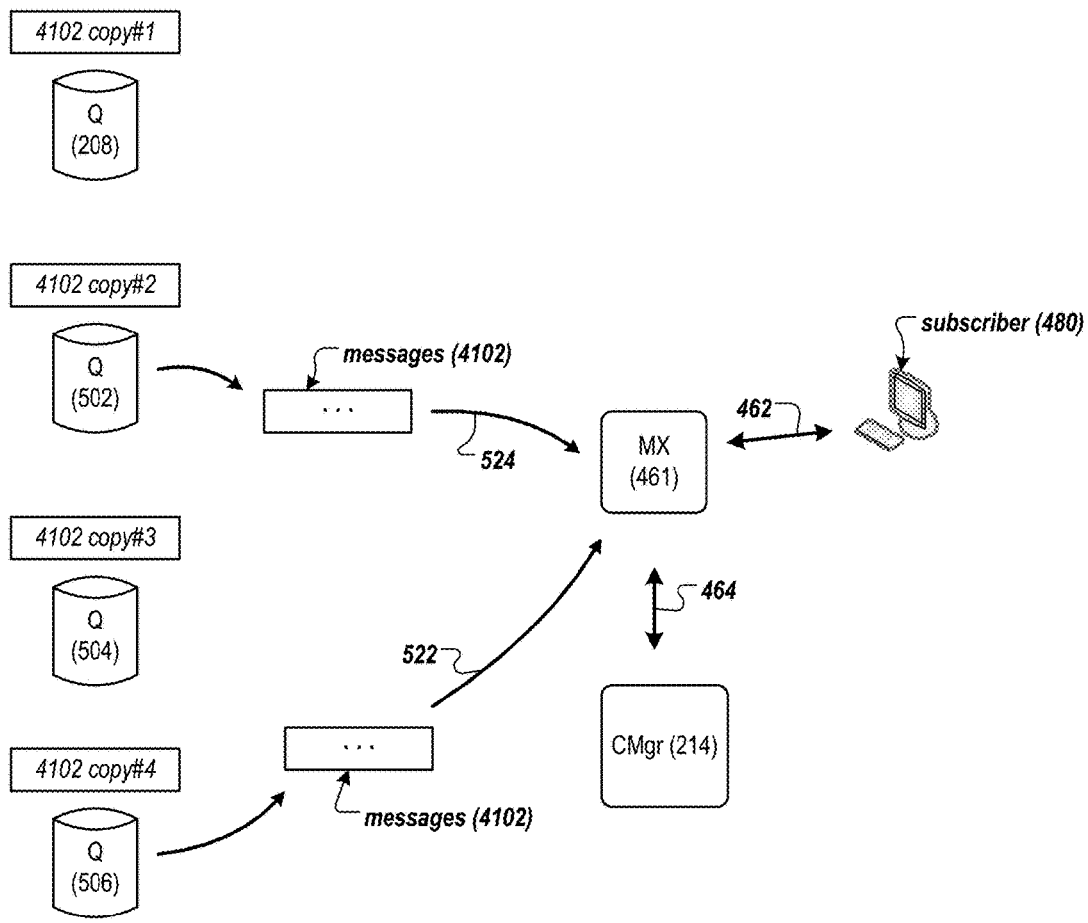
FIG. 5B is a data flow diagram of an example method for retrieving stored messages in a messaging system.

Messages of the streamlet 4102 can be retrieved and delivered to a subscriber of the channel foo from one of the copies of the streamlet 4102. FIG. 5B is a data flow diagram of an example method 550 for retrieving stored messages in the messaging system 100. For instance, the subscriber 480 can send a request for subscribing to messages of the channel to the MX node 461, as described earlier in reference to FIG. 4B. The configuration manager 214 can provide to the MX node 461 a read grant for one of the copies of the streamlet 4102. The MX node 461 can retrieve messages of the streamlet 4102 from one of the Q nodes storing a copy of the streamlet 4102, and provide the retrieved messages to the subscriber 480. For instance, the MX node 461 can retrieve messages from the copy #4 (the tail copy) stored on the Q node 506 (522). As for another example, the MX node 461 can retrieve messages from the copy #2 stored on the Q node 502 (524). In this way, the multiple copies of a streamlet (e.g., copies #1, #2, #3, and #4 of the streamlet 4102) provide replication and redundancy against failure if only one copy of the streamlet were stored in the messaging system 100. In various implementations, the configuration manager 214 can balance workloads among the Q nodes storing copies of the streamlet 4102 by directing the MX node 461 (e.g., with a read grant) to a particular Q node that has, for example, less current read and write grants as compared to other Q nodes storing copies of the streamlet 4102.

A Q node storing a particular copy in a chain of copies of a streamlet may fail, e.g., a computing process on the Q node storing the particular copy may freeze. Other failure modes of a Q node are possible. An MX node can detect a failed node (e.g., from non-responsiveness of the failed node) and report the failed node to a configuration manager in the messaging system 100 (e.g., configuration manager 214). A peer Q node can also detect a failed Q node and report the failed node to the configuration manager. For instance, an upstream Q node may detect a failed downstream Q node when the downstream Q node is non-responsive, e.g., fails to acknowledge a message storage request from the upstream Q node as described earlier. It is noted that failure of a Q node storing a copy of a particular streamlet of a particular channel stream does not have to be for publish or subscribe operations of the particular streamlet or of the particular channel stream. Failure stemming from operations on another streamlet or another channel stream can also alert a configuration manager about failure of a Q node in the messaging system 100.

Figure 5C:
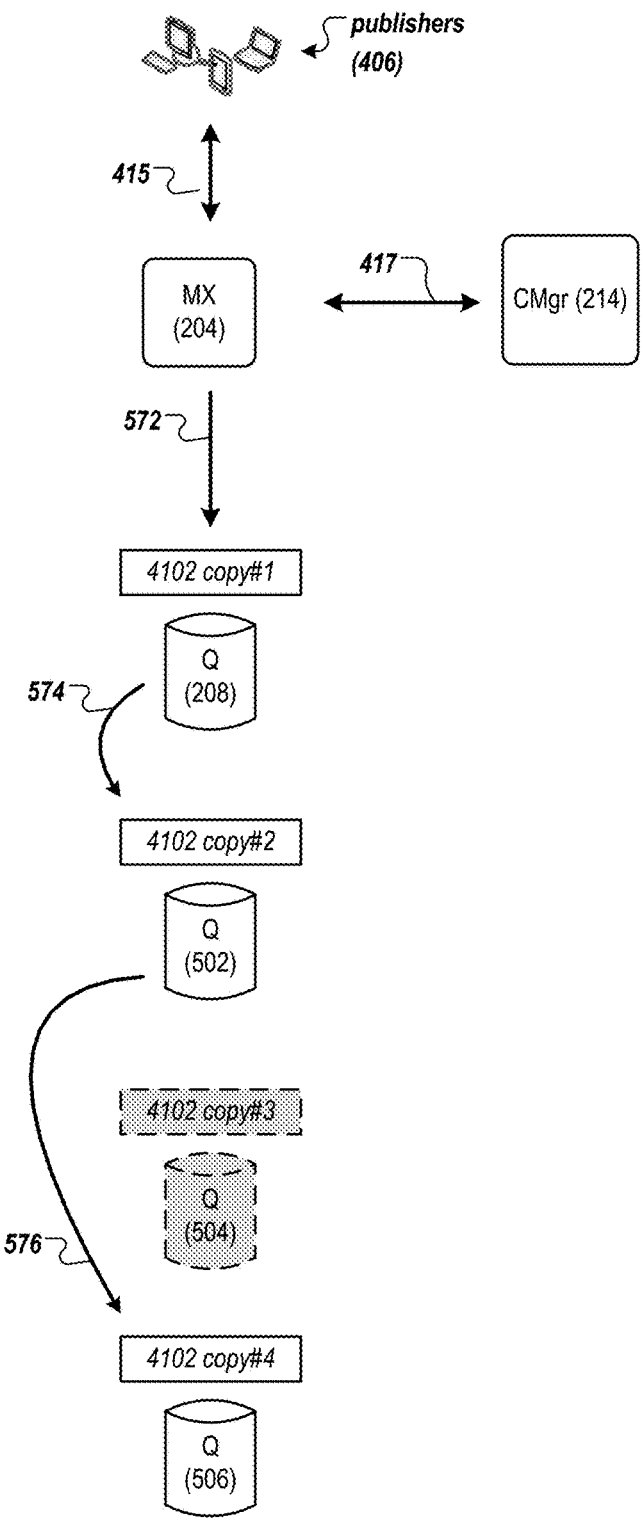
FIGS. 5C and 5D are data flow diagrams of example methods for repairing a chain of copies of data in a messaging system.
Figure 5D:
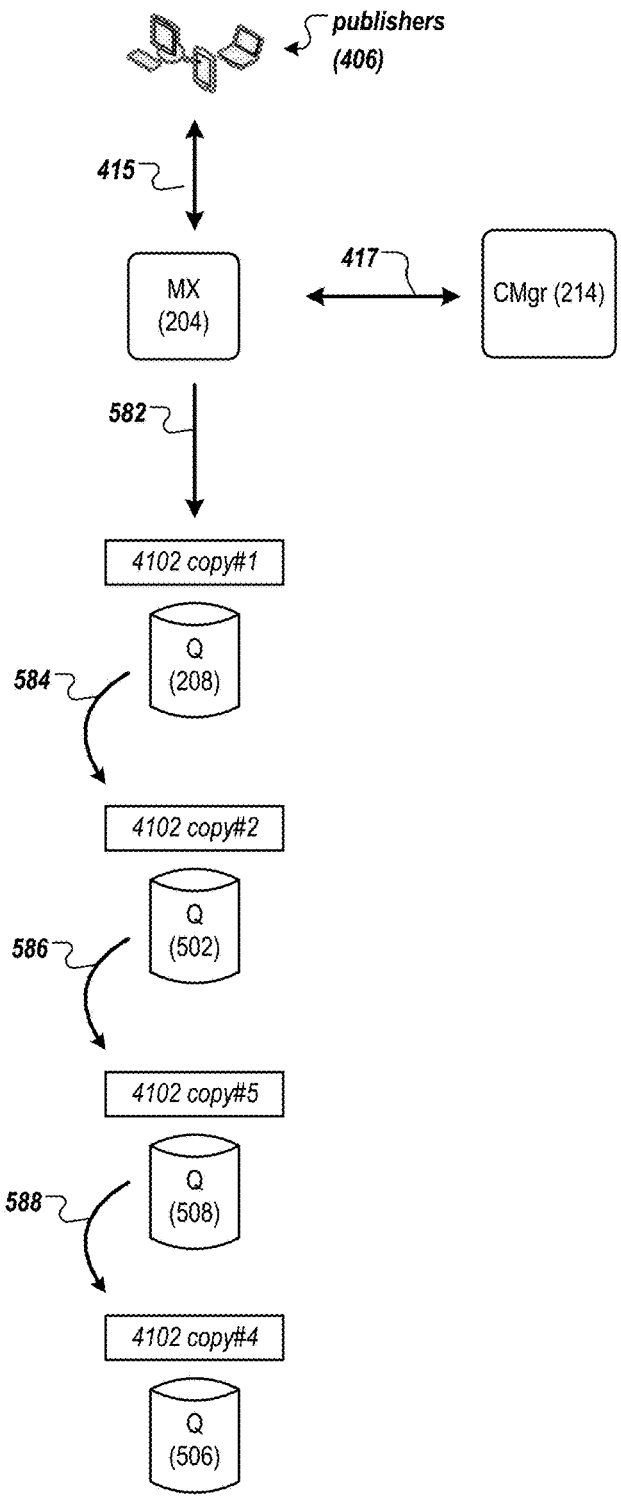

When a Q node storing a particular copy in a chain of copies of a streamlet fails, a configuration manager in the messaging system 100 can repair the chain by removing the failed node, or by inserting a new node for a new copy into the chain, for example. FIGS. 5C and 5D are data flow diagrams of example methods for repairing a chain of copies of a streamlet in the messaging system 100. In FIG. 5C, for instance, after detecting that the Q node 504 fails, the configuration manager 214 can repair the chain of copies by redirecting messages intended to be stored in the copy #3 of the streamlet 4102 on the Q node 502 to the copy #4 of the streamlet 4102 on the Q node 506. In this example, a message (or a block of messages) is first sent from the MX node 204 to the Q node 208 for storage in the copy #1 of the streamlet 4102 (572). The message then is forwarded to the Q node 502 for storage in the copy #2 of the streamlet 4102 (574). The message is then forwarded to the Q node 506 for storage in the copy #4 of the streamlet 4102 (576). The Q node 506 can send an acknowledgement message to the configuration manager 214 indicating that the message has been stored successfully.

Here, a failed node can also be the node storing the head copy or the tail copy of the chain of copies. For instance, if the Q node 208 fails, the configuration manager 214 can instruct the MX node 204 first to send the message to the Q node 502 for storage in the copy #2 of the streamlet 4102. The message is then forwarded to the next adjacent copy in the chain for storage, until the message is stored in the tail copy.

If the Q node 506 fails, the configuration manager 214 can repair the chain of copies of the streamlet 4102 such that the copy #3 on the Q node 504 becomes the tail copy of the chain. A message is first stored in the copy #1 on the Q node 208, then subsequently stored in the copy #2 on the Q node 502, and the copy #3 on the Q node 504. The Q node 504 then can send an acknowledgement message to the configuration manager 214 indicating that the message has been stored successfully.

In FIG. 5D, the configuration manager 214 replaces the failed node Q node 504 by allocating a new Q node 508 to store a copy #5 of the chain of copies of the streamlet 4102. In this example, the configuration manager 214 instructs the MX node 204 to send a message (from the publishers 406) to the Q node 208 for storage in the copy #1 of the streamlet 4102 (582). The message is then forwarded to the Q node 502 for storage in the copy #2 of the streamlet 4102 (584). The message is then forwarded to the Q node 508 for storage in the copy #5 of the streamlet 4012 (586). The message is then forwarded to the Q node 506 for storage in the copy #4 of the streamlet 4102 (588). The Q node 506 can send an acknowledgement message to the configuration manager 214 indicating that the message has been stored successfully.

Figure 6:
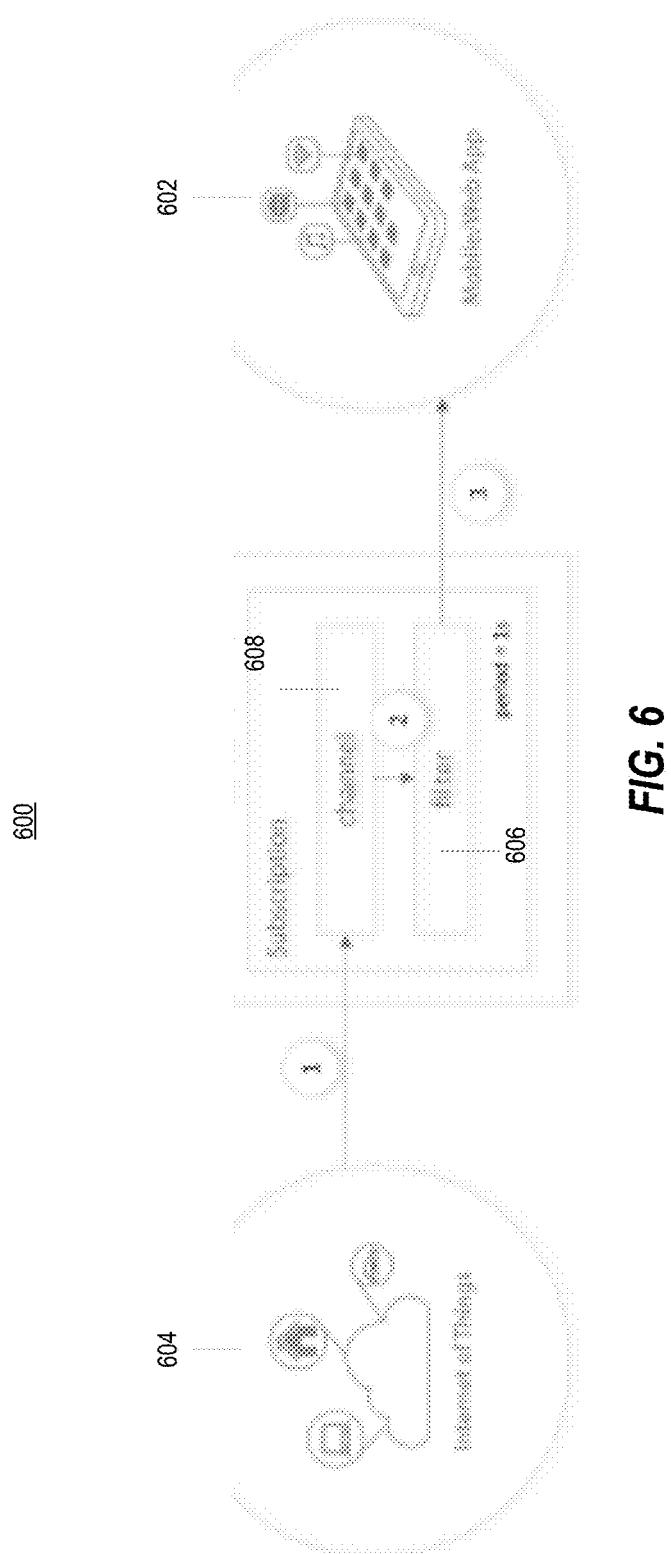
FIG. 6 is an example data flow diagram for the application of filtering criteria in a messaging system.

FIG. 6 is a data flow diagram 600 illustrating the application of selective filtering, searching, transforming, querying, aggregating and transforming of messages in real time to manage the delivery of messages into and through each channel and on to individual subscribers. Users operating applications on client devices, such as, for example, smartphones, tablets, and other internet-connected devices, act as subscribers (e.g., subscriber 480 in FIG. 4B, subscriber 602 in FIG. 6). The applications may be, for example, consumers of the messages to provide real-time information about news, transportation, sports, weather, or other subjects that rely on published messages attributed to one or more subjects and/or channels. Message publishers 604 can be any internet-connected service that provides, for example, status data, transactional data or other information that is made available to the subscribers 602 on a subscription basis. In some versions, the relationship between publishers and channels is 1:1, that is there is one and only one publisher that provides messages into that particular channel. In other instances, the relationship may be many-to-one (more than one publisher provides messages into a channel), one-to-many (a publisher's messages are sent to more than one channel), or many-to-many (more than one publisher provides messages to more than one channel). Typically, when a subscriber subscribes to a channel, they receive all messages and all message data published to the channel as soon as it is published. The result, however, is that many subscribers can receive more data (or data that requires further processing) than is useful. The additional filtering or application of functions against the data places undue processing requirements on the subscriber application and can delay presentation of the data in its preferred format.

A filter 606 can be created by providing suitable query instructions at, for example, the time the subscriber 602 subscribes to the channel 608. The filter 606 that is specified can be applied to all messages published to the channel 608 (e.g., one message at a time), and can be evaluated before the subscriber 602 receives the messages (e.g., see block 2 in FIG. 6). By allowing subscribers 602 to create query instructions a priori, that is upon subscribing to the channel 608 and before data is received into the channel 608, the burden of filtering and processing messages moves closer to the data source, and can be managed at the channel level. As a result, the messages are pre-filtered and/or pre-processed before they are forwarded to the subscriber 602. Again, the query instructions need not be based on any a priori knowledge of the form or substance of the incoming messages. The query instructions can be used to pre-process data for applications such as, for example, real-time monitoring services (for transportation, healthcare, news, sports, weather, etc.) and dashboards (e.g., industrial monitoring applications, financial markets, etc.) to filter data, summarize data and/or detect anomalies. One or more filters 606 can be applied to each channel 608.

The query instructions can implement real-time searches and queries, aggregate or summarize data, or transform data for use by a subscriber application. In some embodiments, including those implementing JSON formatted messages, the messages can be generated, parsed and interpreted using the query instructions, and the lack of a pre-defined schema (unlike conventional RDBMS/SQL-based applications) means that the query instructions can adapt to changing business needs without the need for schema or application layer changes. This allows the query instructions to be applied selectively at the message level within a channel, thus filtering and/or aggregating messages within the channel. In some instances, the queries may be applied at the publisher level—meaning channels that receive messages from more than one publisher may apply certain filters against messages from specific publishers. The query instructions may be applied on a going-forward basis, that is on only newly arriving messages, and/or in some cases, the query instructions may be applied to historical messages already residing in the channel queue.

The query instructions can be applied at either or both of the ingress and egress side of the PubSub service. On the egress side, the query instructions act as a per-connection filter against the message channels, and allows each subscriber to manage their own set of unique filters. On the ingress side, the query instructions operate as a centralized, system-wide filter that is applied to all published messages.

For purposes of illustration and not limitation, examples of query instructions that may be applied during message ingress include:

A message may be distributed to multiple channels or to a different channel (e.g., based on geo-location in the message, or based on a hash function of some value in the message).

A message may be dropped due to spam filtering or DoS rules (e.g., limiting the number of messages a publisher can send in a given time period).

An alert message may be sent to an admin channel on some event arriving at any channel (e.g., cpu_temp>threshold).

For purposes of illustration and not limitation, examples of query instructions that may be applied during message egress include:

Channels that contain events from various sensors where the user is only interested in a subset of the data sources.

Simple aggregations, where a system reports real time events, such as cpu usage, sensor temperatures, etc., and we would like to receive some form of aggregation over a short time period, irrespective of the number of devices reporting or the reporting frequency, e.g., average(cpu_load), max(temperature), count(number_of_users), count(number_of_messages) group by country.

Transforms, where a system reports real time events and metadata is added to them from mostly static external tables, e.g., adding a city name based on IP address, converting an advertisement ID to a marketing campaign ID or to a marketing partner ID.

Adding default values to event streams where such values do not exist on certain devices.

Advanced aggregations, where a system reports real time events, and combines some mostly static external tables data into the aggregation in real time, e.g., grouping advertisement clicks by partners and counting number of events.

Counting number of user events, grouping by a/b test cell allocation.

In some embodiments, the query instructions may be used to define an index or other suitable temporary data structure, which may then be applied against the messages as they are received into the channel to allow for the reuse of the data element(s) as searchable elements. In such cases, a query frequency may be maintained to describe the number of times (general, or in a given period) that a particular data element is referred to or how that element is used. If the frequency that the data element is used in a query exceeds some threshold, the index may be stored for subsequent use on incoming messages, whereas in other instances in which the index is used only once (or infrequently) it may be discarded. In some instances, the query instruction may be applied to messages having arrived at the channel prior to the creation of the index. Thus, the messages are not indexed according to the data elements described in the query instructions but processed using the query instructions regardless, whereas messages arriving after the creation of the index may be filtered and processed using the index. For queries or other subscriptions that span the time at which the index may have been created, the results of applying the query instructions to the messages as they are received and processed with the index may be combined with results of applying the query instructions to non-indexed messages received prior to receipt of the query instructions.

For purposes of illustration and not limitation, one use case for such a filtering application is a mapping application that subscribes to public transportation data feeds, such as the locations of all buses across a city. The published messages may include, for example, geographic data describing the location, status, bus agency, ID number, route number, and route name of the buses. Absent pre-defined query instructions, the client application would receive individual messages for all buses. However, query instructions may be provided that filter out, for example, inactive routes and buses and aggregate, for example, a count of buses by agency. The subscriber application receives the filtered bus data in real time and can create reports, charts and other user-defined presentations of the data. When new data is published to the channel, the reports can be updated in real time based on a period parameter (described in more detail below).

The query instructions can be provided (e.g., at the time the subscriber subscribes to the channel) in any suitable format or syntax. For example, the following illustrates the structure of several fields of a sample subscription request Protocol Data Unit (PDU) with the PDU keys specific to adding a filter to a subscription request:

```
{
"action": "subscribe",
"body": {
"channel": "ChannelName"
"filter": "QueryInstructions"
"period": [1-60, OPTIONAL]
}
}
```

In the above subscription request PDU, the "channel" field can be a value (e.g., string or other appropriate value or designation) for the name of the channel to which the subscriber wants to subscribe. The "filter" field can provide the query instructions or other suitable filter commands, statements, or syntax that define the type of key/values in the channel message to return to the subscriber. The "period" parameter specifies the time period in, for example, seconds, to retain messages before returning them to the subscriber (e.g., an integer value from 1 to 60, with a default of, for example, 1). The "period" parameter will be discussed in more detail below. It is noted that a subscription request PDU can include any other suitable fields, parameters, or values.

One example of a query instruction is a "select" filter, which selects the most recent (or "top") value for all (e.g., "select.*") or selected (e.g., "select.name") data elements. In the example below, the Filter column shows the filter value sent in the query instructions as part of a subscription as the filter field. The Message Data column lists the input of the channel message data and the message data sent to the client as output. In this example, the value for the "extra" key does not appear in the output, as the "select" filter can return only the first level of results and does not return any nested key values.

| Filter | Message Data |
| --- | --- |
| SELECT * | Input<br>{"name": "art", "eye": "blue"),<br>{"name": "art", "age": 11},<br>{"age": 12, "height": 190}<br>Output<br>{"name": "art", "age": 12, "eye": "blue", "height": 190} |
| SELECT top.* | Input<br>{"top": {"age": 12, "eyes": "blue"}},<br>{"top": {"name": "joy", "height": 168}, "extra": 1},<br>{"top": {"name": "art"}}<br>Output<br>{"name": "art", "age": 12, "eye": "blue", "height": 168} |

For aggregative functions, all messages can be combined that satisfy the query instructions included in the GROUP BY clause. The aggregated values can then be published as a single message to the subscriber(s) at the end of the aggregation period. The number of messages that are aggregated depends on, for example, the number of messages received in the channel in the period value for the filter. For instance, if the period parameter is set to 1, and 100 messages are received in one second, all 100 messages are aggregated into a single message for transmission to the subscsriber(s). As an example, a query instruction as shown below includes a filter to aggregate position data for an object, grouping it by obj_id, with a period of 1:

SELECT*WHERE (<expression with aggregate function>) GROUP BY obj_id

In this example, all messages published in the previous second with the same obj_id are grouped and sent as a batch to the subscriber(s).

In some embodiments, a MERGE(*) function can be used to change how aggregated message data is merged. The MERGE(*) function can return a recursive union of incoming messages over a period of time. The merge function may be used, for example, to track location data for an object, and the subscriber is interested in the most recent values for all key/value pairs contained in a set of aggregated messages. The following statement shows an exemplary syntax for the MERGE(*) function:

SELECT [expr] [name,]MERGE(*)[.*] [AS name] [FROM expr] [WHERE expr] [HAVING expr] GROUP BY name The following examples illustrate how the MERGE(*) function may be applied within query instructions to various types of channel messages. In the following examples, the Filter column shows the filter value included in the query instructions as part of a subscription request as the FILTER field. The Message Data column lists the Input channel message data and the resulting message data sent to the subscriber as Output. The filter returns the most recent values of the keys identified in the input messages, with the string MERGE identified as the column name in the output message data. The first example below shows the MERGE(*) function in a filter with a wildcard, for the message data is returned using the keys from the input as column names in the output.

| Filter | Message Data |
|---|---|
| SELECT MERGE(*) | Input<br>{"name": "art", "age": 10},<br>{"name": "art", "age": 11, "items": [0]}<br>Output<br>{"MERGE": {"name": "art", "age": 11, "items": [0]}} |

The next example illustrates the use of the MERGE(*) function in a filter using a wildcard and the "AS" statement with a value of MERGE. The output data includes MERGE as the column name.

| Filter | Message Data |
|---|---|
| SELECT MERGE(*).* | Input<br>{<br>  "name": "art",<br>  "age": 12,<br>  "items": [0],<br>  "skills": {<br>    "work": ["robots"]<br>  }<br>},<br>{<br>  "name": "art",<br>  "age": 13,<br>  "items": ["car"],<br>  "skills": {<br>    "home": ["cooking"]<br>  }<br>}<br>Output<br>{<br>  "name": "art",<br>  "age": 13,<br>  "items": ["car"],<br>  "skills": {<br>    "work": ["robots"],<br>    "home": ["cooking"]<br>  }<br>} |
| SELECT MERGE(top.*) AS merge | Input<br>{"top": { }, "garbage": 0},<br>{"top": {"name": "art", "eyes": "blue"}},<br>{"top": {"name": "joy", "height": 170}}<br>Output<br>{"merge": {"name": "joy", "eyes": "blue", "height": 170}} |

Generally, for aggregative functions and for filters that only include a SELECT(expr) statement, only the latest value for any JSON key in the message data from the last message received can be stored and returned. Therefore, if the most recent message received that satisfies the filter statement is missing a key value identified in a previously processed message, that value is not included in the aggregate, which could result in data loss. However, filters that also include the MERGE(*) function can retain the most recent value for all keys that appear in messages to an unlimited JSON object depth. Accordingly, the most recent version of all key values can be retained in the aggregate.

The MERGE(*) function can be used to ensure that associated values for all keys that appear in any message during the aggregation period also appear in the final aggregated message. For example, a channel may track the physical location of an object in three dimensions: x, y, and z. During an aggregation period of one second, two messages are published to the channel, one having only two parameters: OBJ{x:1, y:2, z:3} and OBJ{x:2, y:3}. In the second message, the z value did not change and was not included in the second message. Without the MERGE(*) function, the output result would be OBJ{x:2, y:3}. Because the z value was not present in the last message in the aggregation period, the z value was not included in the final aggregate. However, with the MERGE(*) function, the result is OBJ{x:2, y:3, z:3}.

The following table shows one set of rules that may be used to aggregate data in messages, depending on the type of data. For arrays, elements need not be merged, but instead JSON values can be overwritten for the array in the aggregate with the last array value received.

| Type of JSON Data | Data to Aggregate {msg1}, {msg2} | Without MERGE(*) | With MERGE(*) |
|---|---|---|---|
| Additional key/value | {a: 1, b: 2}, {c: 3} | {c: 3} | {a: 1, b: 2, c: 3} |
| Different value datatype | {a: 2}, {a: "2"} | {a: "2"} | {a: "2"} |
| Missing key/value | {a: 2}, { } | {a: 2} | {a: 2} |
| null value | {a: 2}, {a: null} | {a: null} | {a: null} |
| Different key value | {a: {b: 1}}, {a: {c: 2}} | {a: {c: 2}} | {a: {b: 1, c: 2}} |
| Arrays | {a: [1, 2]}, {a: [3, 4]} | {a: [3, 4]} | {a: [3, 4]} |

The query instructions can be comprised of one or more suitable filter commands, statements, functions, or syntax. For purposes of illustration and not limitation, in addition to the SELECT and MERGE functions, the query instructions can include filter statements or functions, such as, for example, ABS(expr), AVG(expr), COALESCE(a[, b . . . ]), CONCAT(a[, b . . . ]), COUNT(expr), COUNT_DISTINCT (expr), IFNULL(expr1, expr2), JSON(expr), MIN(expr[, expr1, . . . ]), MAX(expr[, expr1, . . . ]), SUBSTR(expr, expr1[, expr2]), SUM(expr), MD5(expr), SHA1(expr), FIRST_VALUE(expr) OVER (ORDER BY expr1), and/or LAST_VALUE(expr) OVER (ORDER BY expr1), where "expr" can be any suitable expression that is capable of being processed by a filter statement or function, such as, for example, a SQL or SQL-like expression. Other suitable filter commands, statements, functions, or syntax are possible for the query instructions.

According to the present invention, non-filtered queries can translate to an immediate copy of the message to the subscriber, without any JSON or other like processing. Queries that include a SELECT filter command (without aggregation) can translate into an immediate filter. In instances in which the messages are formatted using JSON, each message may be individually parsed and any WHERE clause may be executed directly on the individual message as it arrives, without the need for creating indices or other temporary data structures. If the messages pass the WHERE clause filter, the SELECT clause results in a filtered message that can be converted back to its original format or structure (e.g., JSON) and sent to the subscriber.

Aggregative functions, such as, for example, COUNT( ), SUM( ), AVG( ), and the like, can translate into an immediate aggregator. In instances in which the messages are formatted using JSON, each message may be individually parsed and any WHERE clause may be executed directly on the individual message as it arrives, without the need for creating indices or other temporary data structures. If a WHERE clause is evaluated, messages passing such criteria are aggregated (e.g., aggregates in the SELECT clause are executed, thereby accumulating COUNT, SUM, AVG, and so forth) using the previous accumulated value and the value from the individual message. Once per aggregation period (e.g., every 1 second), the aggregates are computed (e.g., AVG=SUM/COUNT), and the SELECT clause outputs the aggregated message, which can be converted to its original format or structure (e.g., JSON) and sent to the subscriber.

More complex aggregative functions, such as, for example, GROUP BY, JOIN, HAVING, and the like, can be translated into a hash table aggregator. Unlike SELECT or other like functions that can use a constant memory, linearly expanding memory requirements can be dependent upon the results of the GROUP BY clause. At most, grouping by a unique value (e.g., SSN, etc.) can result in a group for each individual message, but in most cases grouping by a common data element (e.g., user_id or other repeating value) can result in far fewer groups. In practice, each message is parsed (from its JSON format, for example). The WHERE clause can be executed directly on the individual message as it arrives, without creating indices or other temporary structures. If the WHERE clause is satisfied, the GROUP BY expressions can be computed directly and used to build a hash key for the group. The aggregative functions in the SELECT clause can be executed, accumulating COUNT, SUM, AVG, or other functions using the previous accumulated value specific for the hash key (group) and the value from the individual message. Once per aggregation period (e.g., every 1 second), the aggregates are computed (e.g., AVG=SUM/COUNT) for each hash key (group), and the SELECT clause can output the aggregated message for each hash key to be converted back to its original format or structure (e.g., JSON) and sent to the subscriber (e.g., one message per hash key (group)).

In embodiments in which the aggregation period is limited (e.g., 1 second-60 seconds) and the network card or other hardware/throughput speeds may be limited (e.g., 10/gbps), the overall maximal memory consumption can be calculated as time * speed (e.g., 1 GB per second, or 60 GB per minute). Hence, the upper bound is independent of the number of subscribers. In certain implementations, each message only need be parsed once (e.g., if multiple filters are set by multiple clients) and only if needed based on the query instructions, as an empty filter does not require parsing the message.

Figure 7A:
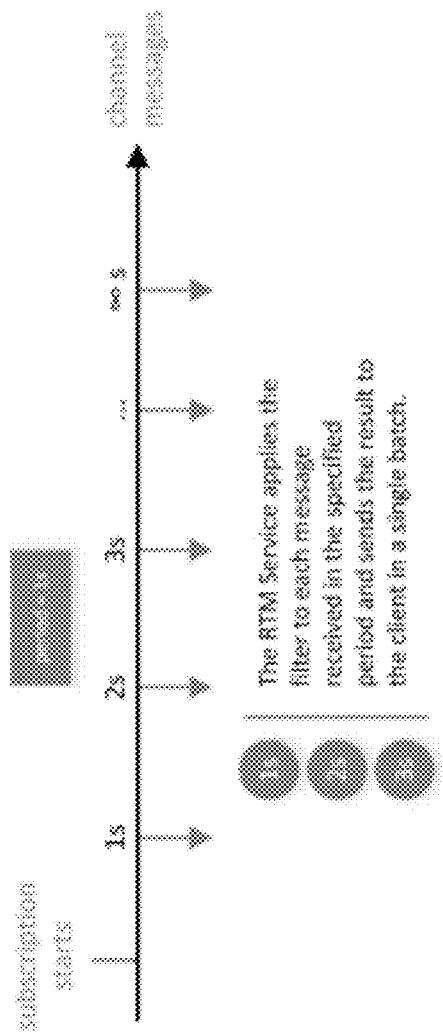
FIGS. 7A-7D are illustrations of how messages may be processed using query instructions that include a period-based parameter.

Referring to FIG. 7A, subscriptions can include a "period" parameter, generally defined in, for example, seconds and in some embodiments can range from 1 to 60 seconds, although other time increments and time ranges are possible. The period parameter(s) can be purely sequential (e.g., ordinal) and/or time-based (e.g., temporal) and included in the self-described data and therefore available for querying, aggregation, and the like. For example, FIG. 7A illustrates the filter process according to the present invention for the first three seconds with a period of 1 second. In the present example, the subscription starts at t=0. The filter created from the query instructions is applied against all messages received during each 1-second period (e.g., one message at a time). The results for each period are then batched and forwarded to the subscriber. Depending on the query instructions used, the messages can be aggregated using the aggregation functions discussed previously before the message data is sent to the subscriber.

In some cases, the process defaults to sending only new, incoming messages that meet the query instructions on to the subscriber. However, a subscriber can subscribe with history and use a filter, such that the first message or messages sent to the subscriber can be the historical messages with the filter applied. Using the period of max_age and/or a "next" parameter provides additional functionality that allows for retrieval and filtering of historical messages.

Figure 7B:
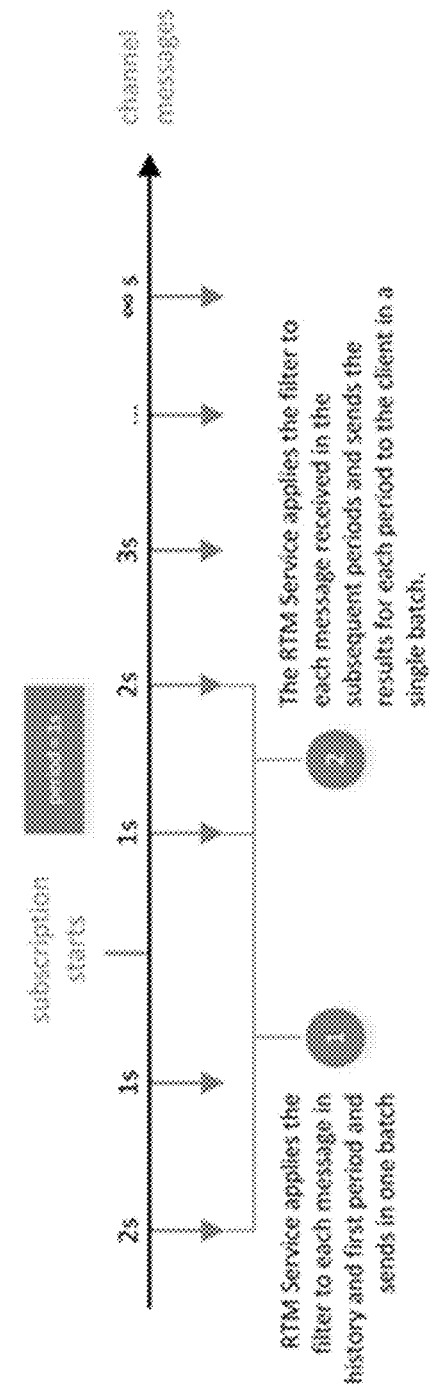

More particularly, a max_age parameter included with the query instructions can facilitate the retrieval of historical messages that meet this parameter. FIG. 7B illustrates an example of a max_age parameter of 2 seconds (with a period of 1 second) that is provided with the query instructions. The filter created from the query instructions is applied to the historical messages from the channel that arrived from t−2 through t=0 (t=0 being the time the subscription starts), and to the messages that arrived in the first period (from t=0 to t+1). These messages can be sent in a single batch to the subscriber (as Group 1). The filter is applied to each message in each subsequent period (e.g., from t+1 to t+2 as Group 2) to batch all messages that meet the query instructions within that period. Each batch is then forwarded on to the subscriber.

Figure 7C:
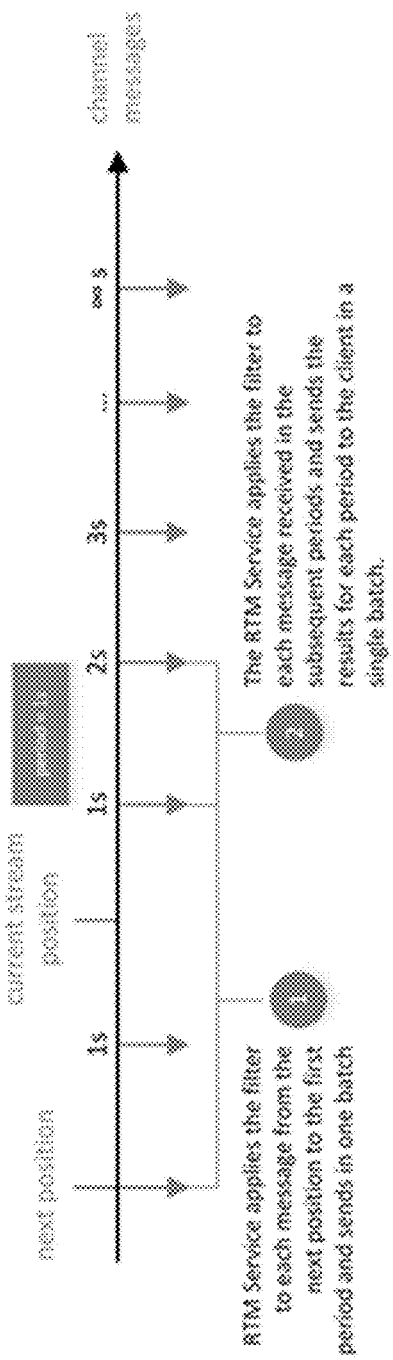

When a subscriber subscribes with a "next" parameter to a channel with a filter, the filter can be applied to all messages from the next value up to the current message stream position for the channel, and the results can be sent to the subscriber in, for example, a single batch. For example, as illustrated in FIG. 7C, a next parameter is included with the query instructions (with a period of 1 second). The next parameter instructs the process to apply the filter created from the query instructions to each message from the "next position" up through the current stream position (e.g., up to t=0) and to the messages that arrived in the first period (from t=0 to t+1). These messages can be sent in a single batch to the subscriber (as Group 1). The filter is applied to each message in each subsequent period (e.g., from t+1 to t+2 as Group 2) to batch all messages that meet the query instructions within that period. Each batch is then forwarded on the subscriber.

Figure 7D:
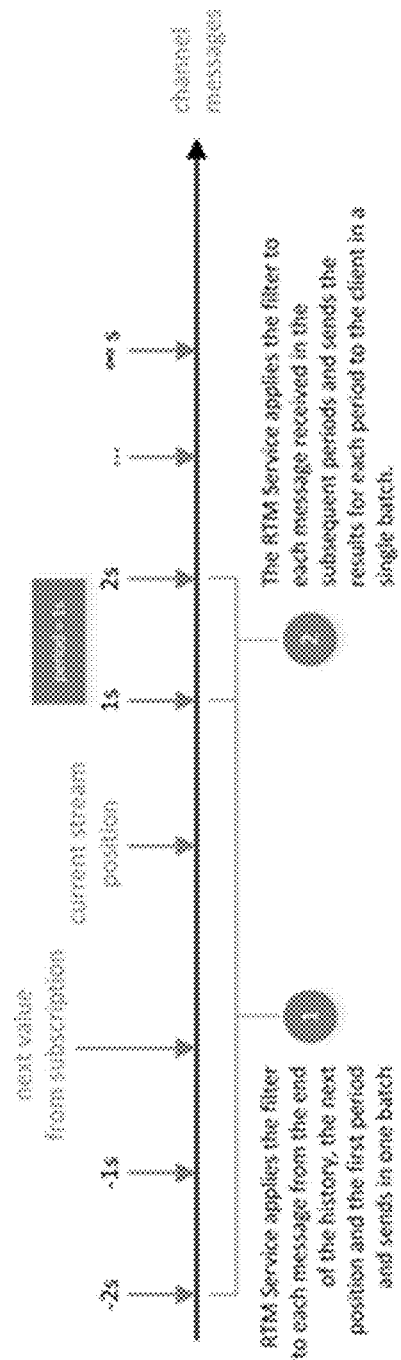

When a subscriber subscribes with a next parameter, chooses to receive historical messages on a channel, and includes a filter in the subscription, the subscriber can be updated to the current message stream position in multiple batches. FIG. 7D illustrates an example of a max_age parameter of 2 seconds (with a period of 1 second) and a next parameter that can be combined into one set of query instructions. The filter created from the query instructions is applied to the historical messages from the channel that arrived from the end of the history to the "next" value of the subscription (i.e., from 2 seconds before the next value up to the next value), to the messages from the next value to the current stream position (e.g., up to t=0), and to the messages that arrived in the first period (from t=0 to t+1). These messages can be sent in a single batch to the subscriber (as Group 1). The filter is applied to each message in each subsequent period (e.g., from t+1 to t+2 as Group 2) to batch all messages that meet the query instructions within that period. Each batch is then forwarded on the subscriber. Consequently, historical messages can be combined with messages that start at a particular period indicator and batched for transmission to the subscriber.

The query instructions can define how one or more filters can be applied to the incoming messages in any suitable manner. For example, the resulting filter(s) can be applied to any or all messages arriving in each period, to any or all messages arriving across multiple periods, to any or all messages arriving in select periods, or to any or all messages arriving on a continuous or substantially continuous basis (i.e., without the use of a period parameter such that messages are not retained before returning them to the subscriber). Such filtered messages can be batched in any suitable manner or sent individually (e.g., one message at a time) to subscribers. In particular, the filtered messages can be sent to the subscriber in any suitable format or syntax. For example, the following illustrates the structure of several fields of a sample channel PDU that contains the message results from a filter request:

```
{
"action": "channel/data",
"body": {
"channel": ChannelName
"next": ChannelStreamPosition
"messages": [ChannelData]+    // Can be one or more messages
}
}
```

In the above channel PDU, the "channel" field can be a value (e.g., string or other appropriate value or designation) of the channel name to which the subscriber has subscribed. The "next" field can provide the channel stream position of the batch of messages returned in the channel PDU. The "messages" field provides the channel data of the messages resulting from application of the specified filter. One or more messages can be returned in the "messages" field in such a channel PDU. It is noted that a channel PDU can include any other suitable fields, parameters, values, or data.

Figure 8:
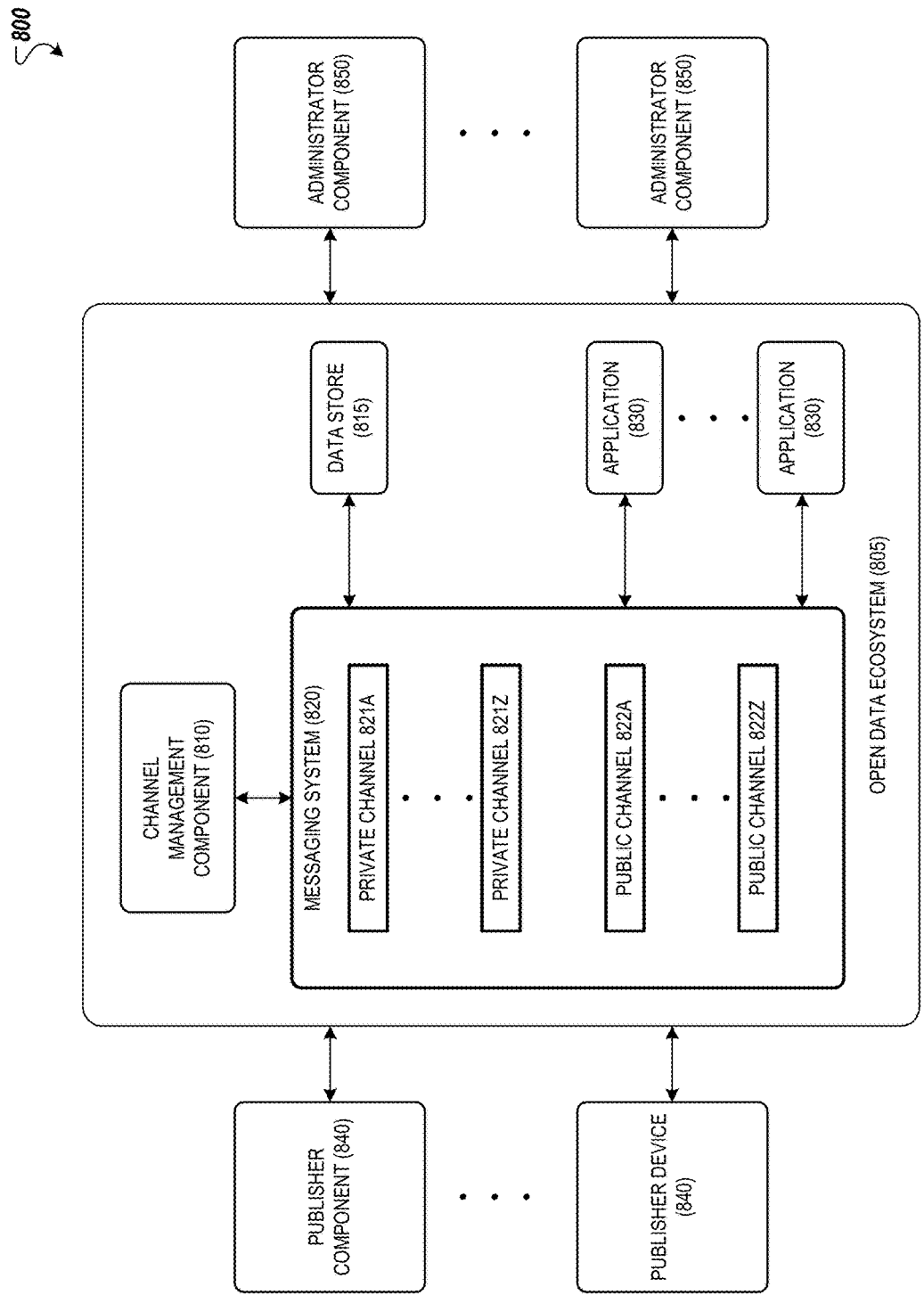
FIG. 8 is a diagram of an example system architecture that may be used to configure channels that of an open data ecosystem.

FIG. 8 is a diagram of an example system architecture 800 that may be used to manage or configure channels of an open data ecosystem 805. The system architecture 800 includes an open data ecosystem 805, publisher components 840, and administrator components 850. The open data ecosystem 805 includes a channel management component 810, a data store 815, a messaging system 820, and applications 830. The messaging system 820 may support the PubSub communication pattern, as described earlier in reference to FIGS. 1A through 5D. The messaging system 820 may be referred to as a PubSub system or a PubSub messaging system. The messaging system 820 includes private channels 821A through 821Z, although any suitable number of channels can be supported by the messaging system 820. The messaging system 820 also includes public channels 822A through 822Z. The messages published to private channels 821A through 821Z and public channels 822A through 822Z (e.g., channel streams) may be divided into streamlets which may be stored within Q nodes of the messaging system 820, as described earlier in reference to FIGS. 1A through 5D. C nodes of the messaging system 820 may be used to offload data transfers from one or more Q nodes (e.g., to cache some of the streamlets stored in the Q nodes). Administrator components 850 and publisher components 840 may establish respective persistent connections (e.g., TCP connections) to one or more MX nodes. The one or more MX nodes may serve as termination points for these connections, as described earlier in reference to FIGS. 1A through 5D. A configuration manager (e.g., illustrated in FIG. 2) may allow administrator components 850 and publisher components 840 to subscribe to channels and to publish to channels. For example, the configuration manager may authenticate the administrator components 850 to determine whether the administrator components 850 are allowed to subscribe to a channel. In another example, the configuration manager may authenticate the publisher components 840 to determine whether the publisher components 840 are allowed to publish to a channel.

The open data ecosystem 805, the channel management component 810, the messaging system 820, the data store 815, the applications 830, the publisher components 840 and the administrator components 850 may be interconnected with each other via one or more networks (not illustrated in FIG. 8). A network may be a public network (e.g., the interne), a private network (e.g., a local area network (LAN) or wide area network (WAN)), or a combination thereof. The network may include a wired or a wireless infrastructure, which may be provided by one or more wireless communications systems, such as a wireless fidelity (WiFi) hotspot connected with the network and/or a wireless carrier system that can be implemented using various data processing equipment, communication towers (e.g. cell towers), etc. The network may carry communications (e.g., data, message, packets, frames, etc.) between the different portions of the system architecture 800.

In one embodiment, a private channel may be a channel where a subset of the users or devices of the open data ecosystem 805 have access to the messages published to the private channel. For example, subscribers or devices that have been authorized or authenticated may be able to receive the messages published to a private channel. Other users or devices that are not authorized subscribers to the private channel may not be able to receive the messages published to the private channel. A private channel may also be a channel where only a subset of publishers can publish to the channel. For example, other publishers who are not authorized or allowed to publish to private channel may be unable to publish messages to the private channel.

In one embodiment, a public channel may be a channel where all users or devices of the open data ecosystem 805 have access to the messages published to the public channel. For example, any user (e.g., any subscriber or publisher) or device of the open data ecosystem 805 may be able to receive the messages published to a public channel. The messages published on the public channel may be provided to all users or devices that wish to receive the messages. In another example, users or devices may not need to be authorized in order to receive messages published to the public channel. A public channel may also be a channel where all users or device may publish to the public channel. For example, any publisher may be able to publish messages to the public channel. In another example, users or devices may not need to be authorized in order to publish messages to the public channel.

In some embodiments, an administrator may be a user that may configure (e.g., manage) channels that are not associated with the administrator. For example, an administrator may be able to configure a channel even though the administrator is not the creator or owner of a channel. The administrator may have access to more channels than a publisher and may be granted more access or permissions to the channels than a publisher.

In some embodiments, the open data ecosystem 805 may allow publishers to publish messages to one or more of the private channels 821A through 821Z and the public channels 822A through 822Z. A publisher may be one or more users, an entity, an organization, etc., that may create channels and publish messages to the channels. The publisher may allow some of the messages to be received by all users of the open data ecosystem 805 by publishing the channels to the public channels 822A through 822Z. The publisher may also allow only certain subscribers to receive messages by publishing the messages to the private channels 821A through 821Z. The publishers may publish live data to the open data ecosystem 805, which may be accessed by all users of the open data ecosystem 805. In some embodiments, the live data may be data that is published to messaging system 820 in real time, near real time, or within a threshold period of time of an action, event, occurrence, or the like that is related to the data. For example, the live data may be data that is published to the messaging system 820 within microseconds, milliseconds, or some other appropriate period of time of an event. This may allow other users of the open data ecosystem 805 to become aware of actions, events, occurrences, etc., in real time. In other embodiments, the live data may be data that may be acted upon or reacted to at one or more of a large volume, at high velocity, and with low latency. For example, live data may be data that may be processed and analyzed by other devices within microseconds or milliseconds of publishing the data to the messaging system 820. The publishers may each exchange live data with each other by publishing the live data to the public channels 822A through 822Z, because all of the publishers are able to receive messages published to the public channels 822A through 822Z. This may enable publishers to develop various applications, which may use the live data to perform various functions, operations, methods, etc., as discussed in more detail below.

In some embodiments, the publishers may create, implement, code, etc., applications 830, which may use the live data that is published to the messaging system 820. For example, the publishers may create applications 830 that may use the messages published to the public channels 822A through 822Z that include the live data. This may allow the applications 830 to perform operations, tasks, functions, etc., more quickly due to the live or real time nature of the live data that is published within the open data ecosystem 805. In other embodiments, the publishers may be able to create, implement, code, etc., applications 830 that may be able to harness or use the various different types of live data that may be published in the open data ecosystem 805. For example, the applications 830 may be able to receive messages with unrelated live data and may be able to determine correlations between the unrelated live data. The applications 830 may also be referred to as, for example, bots, streambots, etc.

One example of an application 830 may be a financial application that may allow users to view the prices of different stocks, bonds, mutual funds, cryptocurrencies, etc. Multiple publishers may publish messages with the live prices of stocks, bonds, etc., and an application 830 may be able to receive those live prices and provide a user with a consolidated list of live prices or perform various actions based on the lives prices (e.g., inform a user that a stock has reached a certain prices). In another example, an application 830 may be a news application that may obtain news stories or articles that may interest a user. Different publishers (e.g., different news outlets) may publish messages with live news stories or articles and the application 830 may process or analyze those messages in real time and display stories or articles that may be of interest to the user.

In one embodiment, a publisher component 840 may be a computing or electronic device that may receive, generate, or otherwise obtain the live data that may be published to one or more channels of the messaging system 820. Examples of computing or electronic devices may include smartphones, personal digital assistants (PDAs), tablet computers, laptop computers, desktop computers, gaming consoles, cellular phones, media players, etc. In some embodiments, a publisher component 840 may be associated with a publisher (e.g., a type of user) of the open data ecosystem 805. In some embodiments, the publisher component 840 may include software components executing on a respective publisher component 840. For example, the publisher components 840 may be applications, software, apps, software services, etc., that are executing on the publisher components 840. The publisher component 840 may publish messages that include live data to one or more of the private channels 821A through 821Z and the public channels 822A through 822Z. This may allow the publisher component 840 to publish messages to various other components or portions of the system architecture 800. For example, this may allow the channel management component 810 to publish messages to one or more applications 830. The publisher component 840 may also subscribe to one or more of the private channels 821A through 821Z and the public channels 822A through 822Z. This may allow the publisher component 840 to receive messages from various other components or portions of the system architecture 800. For example, this may allow the publisher component 840 to receive messages from the channel management component 810.

In one embodiment, the publisher component 840 may allow a publisher to configure one or more of the private channels 821A through 821Z and the public channels 822A through 822Z that are associated with the publisher. For example, the publisher component 840 may allow a publisher to create a channel, change the settings or configuration of a channel, remove a channel, authorize subscribers to a channel, request that a channel be converted or reconfigured from a private channel to a public channel, etc., as discussed in more detail below. The channels that are associated with the publisher may be created by the publisher, may be channels that the publisher is allowed to publish messages to, or may be channels that the publisher has control over (e.g., may be channels that are owned by the publisher). The publisher component 840 may receive GUIs that are hosted or provided by the channel management component 810. For example, the publisher component 840 may receive web pages hosted by the channel management component 810 that include the GUIs. The publisher component 840 may also provide or display its own GUIs based on data received from the channel management component 810. For example, the publisher component 840 may receive messages from the channel management component 810, may generate a GUI, and may fill in fields of the GUI based on the messages.

In one embodiment, an administrator component 850 may be a computing or electronic device that allows an administrator (e.g., a type of user) to configure one or more of the private channels 821A through 821Z and the public channels 822A through 822Z. For example, the publisher component 840 may allow an administrator to change the settings or configuration of a channel, view channel information for a channel, create a channel, remove a channel, convert or reconfigure a channel from a private channel to a public channel or vice versa, etc., as discussed in more detail below. The administrator may be able to configure channels that are not associated with the administrator. For example, the administrator may be able to configure channels that are created by other publishers. The administrator component 850 may receive GUIs that are hosted or provided by the channel management component 810. For example, the administrator component 850 may receive web pages hosted by the channel management component 810 that include the GUIs. The administrator component 850 may also provide or display its own GUIs based on data received from the channel management component 810. For example, the administrator component 850 may receive messages from the channel management component 810, may generate a GUI, and may fill in fields of the GUI based on the messages.

In one embodiment, the publisher component 840 may include software components executing on a respective publisher component 840. For example, the publisher components 840 may be applications, software, apps, software services, etc., that are executing on the publisher components 840. The publisher component 840 may publish messages that include live data to one or more of the private channels 821A through 821Z and the public channels 822A through 822Z. This may allow the publisher component 840 to publish messages to various other components or portions of the system architecture 800. For example, this may allow the publisher component 840 to publish messages to one or more applications 830. The publisher component 840 may also subscribe to one or more of the private channels 821A through 821Z and the public channels 822A through 822Z. This may allow the publisher component 840 to receive messages from various other components or portions of the system architecture 800. For example, this may allow the publisher component 840 to receive messages from the channel management component 810.

In one embodiment, the messages may be stored in a respective buffer for the channel associated with the message. The messages in the respective buffer may be stored according to an order, as discussed above. For example, messages in a buffer may be stored in the order in which the messages were published to a respective channel. Each buffer may have an expiration time based on when the buffer was allocated to a respective channel, as discussed above. The messaging system 820 may retrieve messages for the particular channel from one or more buffers allocated to the channel that have not expired and according to the order.

In one embodiment, the channel management component 810 may include one or more computing devices (e.g., one or more server computers) or may include software components executing on the one or more computing devices. For example, the channel management component 810 may include one or more server computers. In another example, the channel management component 810 may be an application that is executing on or distributed among one or more server computers.

In one embodiment, the channel management component 810 may provide one or more GUIs to users of the open data ecosystem 805. For example, the channel management component 810 may provide one or more GUIs to a publisher (e.g., one type of user) of the open data ecosystem 805. In another example, the channel management component 810 may provide one or more GUIs to an administrator (e.g., another type of user) of the open data ecosystem 805. The one or more GUIs may include various user interface elements such as text fields, entry fields, search bars, check boxes, buttons, radio buttons, toggle buttons, drop down menus, links (e.g., web links), slide bars, tabs, lists, icons, text images, graphics, text boxes, windows, overlays, or other user interface widgets or elements.

In some embodiments, the channel management component 810 may be a web portal or a web server that may provide one or more web pages to the users of the open data ecosystem 805. The one or more web pages may present the one or more GUIs when the web pages are accessed by a computing device. For example, the channel management component 810 may provide the web pages to a publisher component 840 or an administrator component 850 and the web pages may include the GUIs (e.g., may include the text fields, menus, buttons, radio buttons, etc.).

In one embodiment, the channel management component 810 may receive user input from one or more users via the one or more GUIs. For example, the GUIs may be web pages hosted or provided by the channel management component 810 to computing devices of the users (e.g., provided to the publisher components 840 or the administrator components 850), as discussed above. Users may enter information (e.g., alphanumeric text or other responses) via user interface elements (e.g., drop down menus, text fields, radio buttons, etc.) on the one or more GUIs and the information may be received by the channel management component 810.

In one embodiment, the channel management component 810 may configure the one or more of the private channels 821A through 821Z and the public channels 822A through 822Z based on the user input received from the users via the one or more graphical user interfaces that are provided by the channel management component 810. For example, the channel management component 810 may change the settings or configuration of channels, remove channels, authorize subscribers for channels, request that a channel be converted or reconfigured from a private channel to a public channel or vice versa, authorize the conversion or reconfiguration of a channel, etc., as discussed in more detail below. The channel information, channel settings, channel configuration, account information, etc., may be stored in the data store 815. The data store 815 may be one or more devices that are capable of storing, accessing, or searching for data. Examples of such devices include, but are not limited to, random access memory, a hard disk drive, a solid state disk drive, a cache, a database, etc.

In one embodiment, the channel management component 810 may receive user input, via a GUI, indicating account information from a user of the open data ecosystem 805, as discussed in more detail below. For example, the channel management component 810 may receive one or more of a user's name (e.g., first name, last name, etc.), a user login (e.g., a user identification (ID)), a password, an email address, a phone number, a mailing address, an organization or entity that the user is associated with (e.g., a company that the user works for), etc. In other embodiments, other types of account information may be used. For example, the user's driver's license information may be used. The channel management component 810 may create an account for the user based on the account information received via the GUI. The channel management component 810 may perform additional authentication or verification procedures and operations before creating the account for the user if the user is creating an administrator account. For example, if the user is requesting to create an account as an administrator of the open data ecosystem 805, additional authentication or verification may occur before the user is allowed to create the account. The account information may be stored in the data store 815.

In one embodiment, the channel management component 810 may receive input, via a GUI, indicating channel information for a channel, as discussed in more detail below. For example, the channel management component 810 may receive user input (e.g., text) indicating a name for the channel, a namespace for the channel, one or more tags that may indicate the subject matter related to the messages that will be published on the channel, etc. The channel management component 810 may create the channel based on the channel information provided by the user. For example, the channel management component 810 may create a new channel in the messaging system 820 with a name indicated in the user input. In some embodiments, new channels created by a user may be private channels when they are created. The channel information may be stored in the data store 815.

In one embodiment, the channel management component 810 may receive user input, via a GUI, indicating that a channel should be deleted or removed from the messaging system 820. For example, the channel management component 810 may receive user input (e.g., text) from a user indicating the name of a channel that should be removed.

The channel management component 810 may remove the channel from the messaging system 820 based on the user input. Such channel information may be stored in the data store 815.

In one embodiment, the channel management component 810 may receive input indicating updated channel information for a channel via a GUI, as discussed in more detail below. For example, the channel management component 810 may receive user input (e.g., text) indicating an updated name for the channel or updated tags for the channel. The channel management component 810 may update the channel information for the channel based on the user input. For example, the channel management component 810 may change the name of the channel, add one or more tags, remove one or more tags, etc., based on the user input. The updated channel information may be stored in the data store 815.

In one embodiment, the channel management component 810 may receive, via a GUI, user input indicating one or more users and access permissions for the one or more users. For example, the channel management component 810 may receive user input indicating a name of a user and one or more permissions to one or more channels for the user. The permissions may indicate whether a user is allowed to configure (e.g., modify or manage) a channel. The channel management component 810 may grant the user the one or more permissions to the one or more channels based on the user input. The users and access permissions may be stored in the data store 815.

In one embodiment, the channel management component 810 may provide a GUI that may provide statistics related to one or more channels of a publisher. For example, a publisher may be associated with a number of channels in the messaging system 820. The GUI may present graphs, charts, tables, text, etc., that may indicate statistics about the number of messages published or received on the channels, the number of subscribers to the channels, the number of subscribers currently connected to channels, etc., over the past few minutes, hours, days, or other appropriate time period. In other embodiments, other statistics that provide information about the usage or utilization of one or more channels may be provided by the GUI. In some embodiments, the GUI provided to the publisher that provides statistics of one or more channels may provide the statistics for only those channels which are associated with the user. The statistics may be stored in the data store 815.

In one embodiment, the channel management component 810 may provide a GUI that may indicate a list of channels to an administrator. The list of channels may include all of the channels in the messaging system 820 (e.g., all of the private channels 821A through 821Z and public channels 822A through 822Z), because the administrator is allowed to view, access or configure all of the channels in the messaging system 820. The GUI may also indicate statuses of properties of the channels listed in the GUI. For example, the GUI may indicate whether a channel is private or public, whether a channel is featured, the date a channel was created, etc. The channel information, statistics, and statuses may be stored in the data store 815.

In one embodiment, the channel management component 810 may provide a GUI that may indicate channel information for a channel to a user. For example, the GUI may provide a GUI that may display channel information for a channel to a publisher or to an administrator of the channel. Examples of the channel information that may be displayed may include a name for a channel, a description for the channel, one or more tags for a channel, an appkey for a channel, an endpoint, a role name, a role secret key, etc. An appkey for a channel may be an internal identifier for a channel that is used by the open data ecosystem 805. An endpoint may be an address (e.g. a network address) for the channel that may be used by applications 830 to access the channel (e.g., to receive messages from the channel).

In one embodiment, the channel management component 810 may provide a GUI to a publisher of the open data ecosystem 805 that indicates a listing of all channels in the messaging system 820 that are associated with the publisher. For example, the GUI may list all of the private channels 821A through 821Z and all of the public channels 822A created by the publisher. The GUI may also indicate whether the channels associated with the publisher are public or awaiting approval for conversion from private to public (or vice versa). For example, the GUI may include text, images, icons, etc., for each channel in the listing of channels to indicate whether the channels are public or awaiting approval. The listing may also indicate other statuses of the channels in the listing of channels. For example, the listing may indicate that a channel was rejected for conversion from private to public, may indicate that a channel is private, may indicate that currently pending approval, or may indicate other appropriate statuses.

In one embodiment, the channel management component 810 may provide a GUI that may indicate a request from a publisher to convert or reconfigure a private channel to a public channel. For example, the publisher may use the GUI provided by the channel management component 810 to submit a request to convert a channel from private to public (e.g., from a private channel to a public channel). The channel management component 810 may determine whether the channel satisfies one or more conditions for converting the channel to a public channel. For example, the channel management component 810 may determine whether the description for a channel provides information about the content of the channel and whether the description is appropriate for the general public (e.g., does not contain profanity, adult content, etc.). In another example, the channel management component 810 may determine whether the tags for the channel provide sufficient information about the content of the channel and whether the tags are appropriate for the general public. In a further example, the channel management component 810 may determine whether a threshold number of messages have been published to the channel over a period of time. For example, the channel management component 810 may determine whether at least ten messages or some other appropriate number of messages have been published to the channel in the last week or some other appropriate period of time. In other embodiments, other conditions may be used. For example, a minimum number of subscribers, a minimum time since the channel was created, etc., may be conditions to convert the channel from a private channel to a public channel.

In some embodiments, the channel management component 810 may determine whether the one or more conditions are satisfied automatically. For example, the channel management component 810 may automatically analyze the channel to determine whether the threshold number of messages have been published within the period of time. In another example, the channel management component 810 may analyze the description or tags of the channel to determine whether profane language is used in the description or tags. In other embodiments, the request may be presented to an administrator via another GUI, and the administrator may approve the request to convert the channel to a public channel based on one or more conditions, as discussed in more detail below.

In one embodiment, the channel management component 810 may convert the channel from private to public when the one or more conditions are satisfied. For example, the channel management component 810 may update or change the configuration of the channel to allow all users of the open data ecosystem 805 access to the messages published on the channel. The channel management component 810 may also update the data store 815 with data indicating that the channel is a public channel (e.g., has been converted or reconfigured from a private channel to a public channel). In some embodiments, the channel management component 810 may provide a GUI to the publisher indicating that the channel has been converted from private to public if the one or more conditions are satisfied. For example, the channel management component 810 may provide a pop up window with text, images, icons, or other GUI elements to indicate that the channel was converted from a private channel to a public channel, if the one or more conditions are satisfied. In other embodiments, the channel management component 810 may provide a GUI to the publisher indicating that the first channel has not been converted from private to public, if the one or more conditions are not satisfied. For example, the channel management component 810 may provide a pop up window with text, images, icons, or other appropriate GUI elements to indicate that the channel was not converted from a private channel to a public channel, if the a threshold number of the one or more conditions are not satisfied. The GUI may also indicate one or more reasons why the one or more conditions were not satisfied. For example, the GUI may indicate which of the one or more conditions are not satisfied. In one embodiment, the channel management component 810 may provide a GUI that may indicate a request from a publisher to convert or reconfigure a public channel to a private channel in a manner similar to that described above and discussed below for converting or otherwise reconfiguring a private channel to a public channel.

In one embodiment, the channel management component 810 may provide a GUI to an administrator of the open data ecosystem 805 that indicates a listing of all channels in the messaging system 820. For example, the GUI may list all of the private channels 821A through 821Z and all of the public channels 822A through 822Z. The GUI may also indicate whether the channels are public or awaiting approval for conversion from private to public (or vice versa). For example, the GUI may include text, images, icons, etc., for each channel in the listing of channels to indicate whether the channels are public or awaiting approval. The listing may also indicate other statuses of the channels in the listing of channels. For example, the listing may indicate that a channel was rejected for conversion from private to public.

In one embodiment, the channel management component 810 may receive user input via a GUI, indicating that that the administrator has selected a first channel from a listing of the channels in the messaging system 820. For example, the use may click or select one of the channels in the listing of channels. In response to the administrator selecting a first channel from the listing of channels, the channel management component 810 may provide a second GUI that allows the administrator to indicate whether the first channel satisfies the one or more conditions to convert the channel from private to public. For example, the second GUI may include text, images, drop down menus, or other appropriate GUI elements that the administrator may activate, click, select, etc., to approve the conversion of a channel from private to public. The administrator may provide user input using the second GUI to indicate that the first channel satisfies the one or more conditions and the channel management component 810 may convert the first channel from private to public based on the user input received from the administrator via the second GUI.

In one embodiment, the channel management component 810 may receive user input via a GUI provided to a publisher, indicating a request to convert a channel from public to private (e.g., to convert a channel from a public channel to a private channel). For example, the channel management component 810 may provide a GUI that allows a publisher to view channel information, as discussed above. The GUI that allows the publisher to view channel information may include text, images, drop down menus, or other appropriate GUI elements that may also allow the publisher to provide user input requesting that the channel be converted (e.g., reconfigured) from a public channel to a private channel. When the channel management component 810 receives the request, the channel management component 810 may convert the channel from public to private. For example, the channel management component 810 may update or change the configuration of the channel to allow only subscribers of the channel to access to the messages published on the channel. The channel management component 810 may also update the data store 815 with data indicating that the channel is a private channel (e.g., has been converted or reconfigured from a public channel to a private channel).

In one embodiment, the channel management component 810 may allow an administrator to indicate that one of the public channels 822A through 822Z is a featured channel. A featured channel may be a channel which may be highlighted, displayed, or otherwise made more prominent relative to other channels, to users of the open data ecosystem. For example, when a publisher or other user views a list of the public channels 822A through 822Z that are available, the featured channel(s) may be displayed in the list first (e.g., the first ten channels in the list may be featured channels). This may allow the channel management component 810 to attract other users or draw attention to the featured channels. In some embodiments, the channel management component 810 may identify featured channels automatically. For example, the channel management component 810 may identify featured channels based on one or more of the time the channels were created, the names of the channels, the description of the channels, the tags of the channels, the number of messages published, the number of subscribers, etc. The channel management component 810 may also identify different sets of featured channels for different users. For example, using machine learning, neural networks, artificial intelligence, etc., the channel management component 810 may identify a set of featured channels that may be of interest to a publisher based on the channel information of the channels associated with the publisher or based on account information of the publisher. The channel management component 810 may store information about whether a channel is a featured channel in the data store 815.

Although the channel management component 810 is illustrated as separate from the messaging system 820 in FIG. 8, the channel management component 810 may be included as part of the messaging system 820 in other embodiments. For example, the channel management component 810 may be part of a Q node. In another example, the channel management component 810 may be part of a MX node or a configuration manager. In some embodiments, one or more of the channel management component 810 or the messaging system 820 may be located within a datacenter or a cloud computing system or architecture. In addition, it shall be understood that the configuration of the private channels 821A through 821Z and public channels 822A through 822Z (e.g., the number of channels, and the publisher or subscribers of the private channels 821A through 821Z and public channels 822A through 822Z) illustrated in FIG. 8 are merely examples and other configurations may be used in other embodiments. For example, two or more channels may be combined into a single channel. In another example, one channel may be split into two more channels.

Figure 9:
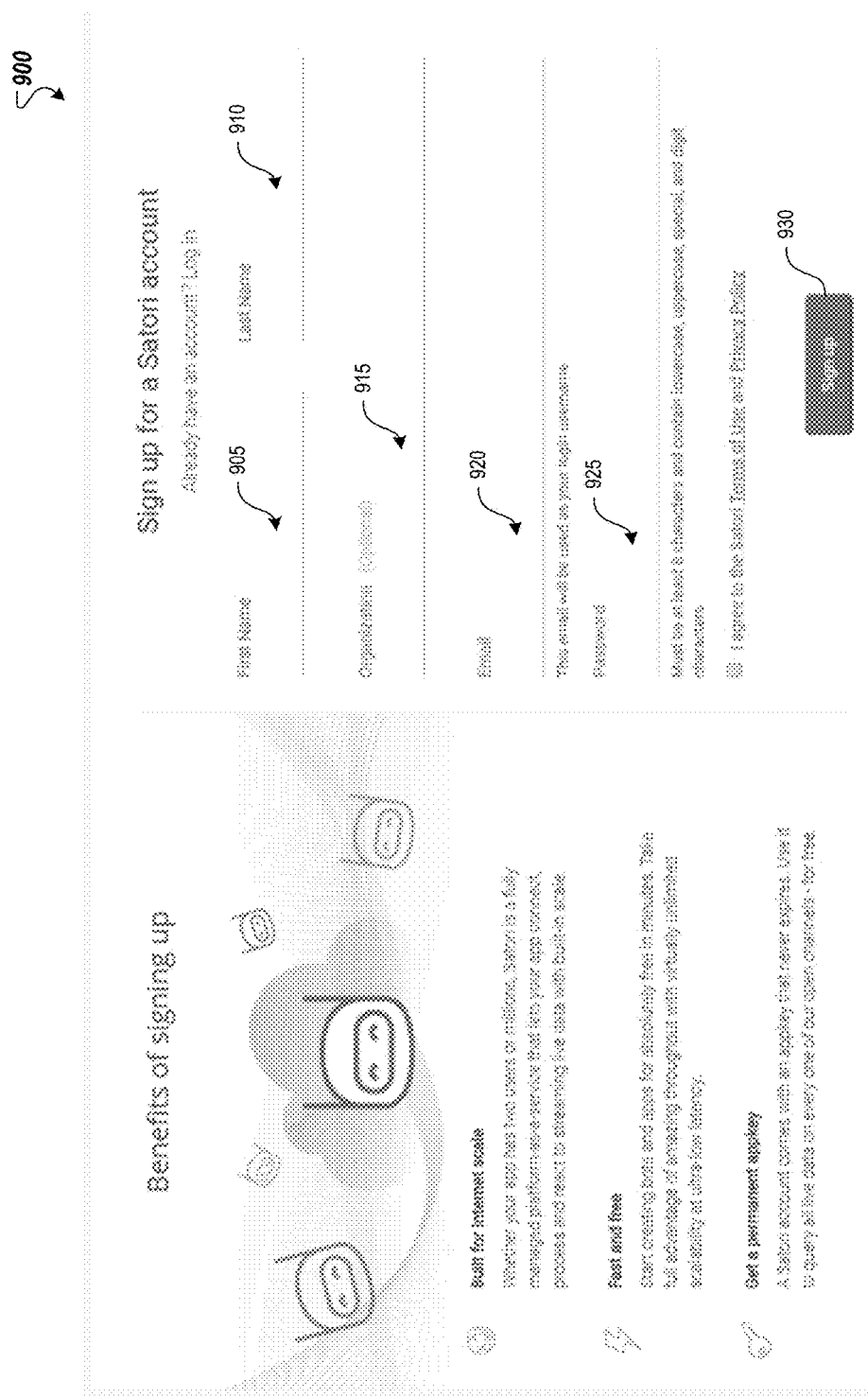
FIG. 9 is a diagram illustrating an example graphical user interface (GUI) that may be provided by a channel management component.

FIG. 9 is a diagram illustrating an example GUI 900 that may be provided by a channel management component (e.g., channel management component 810 illustrated in FIG. 8). The channel management component may provide the GUI 900 to a publisher in an open data ecosystem (e.g., open data ecosystem 805 illustrated in FIG. 8). As discussed above, a publisher may be a user that may publish messages in one or more channels of the open data ecosystem. The GUI 900 may be displayed to the publisher by a publisher component (e.g., a web browser, an application, etc.), as discussed above. The GUI 900 illustrated in FIG. 9 includes example GUI elements. In other embodiments, the GUI 900 may include various other GUI elements such as text fields, search bars, buttons, radio buttons, toggle buttons, menus, overlays, drop down menus, links (e.g., web links), slide bars, tabs, lists, icons, text images, graphics, text boxes, windows, overlays, or other appropriate user interface widgets or elements. The GUI 900 includes text fields 905, 910, 915, 920, and 925, and button 930.

The text fields 905, 910, 915, 920, and 925 allow the publisher to provide account information to create an account for the open data ecosystem. Text field 905 allows the publisher to provide a first name of the publisher (e.g., the user's first name) and the text field 910 allows the publisher to provide a last name of the publisher (e.g., the user's last name). Text field 915 allows the publisher to provide a name of the organization or entity with whom the publisher is associated. For example, the text field 915 allows the publisher to provide the name of the company for whom the publisher works. Text field 920 allows the publisher to provide an email address of the publisher. The email address may also be the publisher's login name or username. Text field 925 allows the publisher to provide a password that will be used to log into the publisher's account. Button 930 allows the user to submit the account information provided in text fields 905, 910, 915, 920, and 925 to the open data ecosystem (e.g., to the channel management component of the open data ecosystem). In other embodiments, the GUI 900 may include other GUI elements to allow the publisher to provide other types of account information. For example, the GUI 900 may include additional text fields, drop down menus, or other appropriate GUI elements to allow the user to provide additional or alternative information about the user, such as a mailing address, a phone number, or other appropriate account information.

Figure 10:
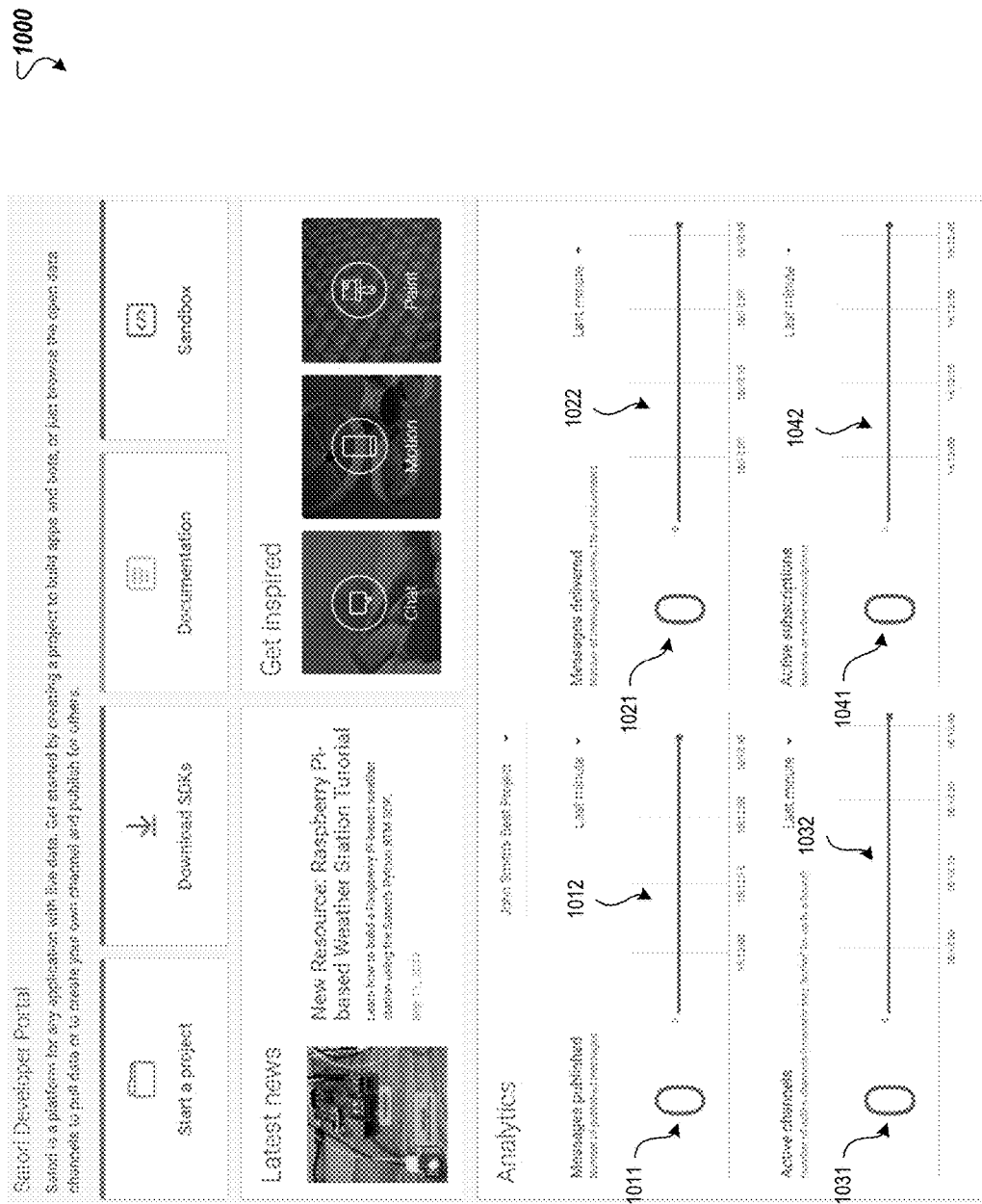
FIG. 10 is a diagram illustrating an example graphical user interface (GUI) that may be provided by a channel management component.

FIG. 10 is a diagram illustrating an example GUI 1000 that may be provided by a channel management component (e.g., channel management component 810 illustrated in FIG. 8). The channel management component may provide the GUI 1000 to a publisher in an open data ecosystem (e.g., open data ecosystem 805 illustrated in FIG. 8). As discussed above, a publisher may be a user that may publish messages in one or more channels of the open data ecosystem. The GUI 1000 may be displayed to the publisher by a publisher component (e.g., a web browser, an application, etc.), as discussed above. The GUI 1000 illustrated in FIG. 10 includes example GUI elements. In other embodiments, the GUI 1000 may include various other GUI elements such as text fields, search bars, buttons, radio buttons, toggle buttons, menus, overlays, drop down menus, links (e.g., web links), slide bars, tabs, lists, icons, text images, graphics, text boxes, windows, overlays, or other appropriate user interface widgets or elements.

The GUI 1000 may present (e.g., display, show, indicate, etc.) statistical information about the channels associated with the publisher, as discussed in more detail below. The GUI 1000 may be referred to as a dashboard. In some embodiments, the GUI 1000 (e.g., the dashboard) may be provided, presented, displayed, etc., to the publisher when the publisher logs into the open data ecosystem. Any suitable type of information may be displayed or otherwise presented to the user in any appropriate number of windows in the GUI 1000. For example, a window 1011 may display the number of messages that have been published on the channels associated with the publisher during a period of time (e.g., during the last minute, during the last hour, during the last day, during the last week, or other appropriated period of time). A graph 1012 may provide a visual representation of the number of messages that have been published on the channels associated with the publisher during the period of time. The Y-axis of the graph 1012 may represent the number of messages published during the period of time and the X-axis of the graph 1012 may represent different times within the period of time. The graph 1012 may also include a drop down menu that may allow the user to change the period of time that may be displayed in the graph 1012. For example, the drop down menu may allow the user change the period of time displayed in the graph 1012 to the last hour, the last day, or some other appropriate period of time.

A window 1021 may display the number of messages that have been delivered to subscribers of the channels associated with the publisher during a period of time (e.g., during the last minute, during the last hour, during the last day, during the last week, or other appropriated period of time). A graph 1022 may provide a visual representation of the number of messages that have been delivered to subscribers of the channels associated with the publisher during a period of time. The Y-axis of the graph 1022 may represent the number of messages delivered during the period of time and the X-axis of the graph 1022 may represent different times within the period of time. The graph 1022 may also include a drop down menu that may allow the user to change the period of time that may be displayed in the graph 1022, as discussed above.

A window 1031 may display the number of active channels associated with the publisher during a period of time (e.g., during the last minute, during the last hour, during the last day, during the last week, or other appropriated period of time). An active channel may be a channel in which messages have been published during the period of time. For example, a channel may be active if at least one message has been published to the channel in the last hour, last day, last three days, or other appropriate period of time. A graph 1032 may provide a visual representation of the number of active channels. The Y-axis of the graph 1032 may represent the number of active channels and the X-axis of the graph 1032 may represent different times within the period of time. The graph 1032 may also include a drop down menu that may allow the user to change the period of time that may be displayed in the graph 1032, as discussed above.

A window 1041 may display the number of subscribers to the channels associated with the publisher during a period of time (e.g., during the last minute, during the last hour, during the last day, during the last week, or other appropriated period of time). A graph 1042 may provide a visual representation of the number of subscribers during the period of time. The Y-axis of the graph 1042 may represent the number of subscribers during the period of time and the X-axis of the graph 1042 may represent different times within the period of time. The graph 1042 may also include a drop down menu that may allow the user to change the period of time that may be displayed in the graph 1042, as discussed above.

In some embodiments, each of the windows 1011, 1021, 1031, and 1041 may be configured to display the same or different periods of time. For example, the period of time for window 1011 may be the last week and the period of time for the window 1041 may be the last two days. In another example, the period of time of time for all of the windows 1011, 1021, 1031, and 1041 may be the last minute. In other embodiments, the graphs 1012, 1022, 1032, and 1042 may be configured to display the same or different periods of time. For example, the period of time for graph 1022 may be the last month and the period of time for the graph 1032 may be the last two weeks. In another example, the period of time of time for all of the graphs 1012, 1022, 1032, and 1042 may be the last day.

In some embodiments, the GUI 1000 may display other types of channel summary information related to all of the channels that are associated with the publisher or any subset of those channels (e.g., a single channel or any group of channels). In addition, different types of channel summary information may be displayed in GUI 1000 depending on the needs of the publisher, the access privileges of the publisher, and other like factors. For example, the GUI 1000 (e.g., the dashboard) can be used to display the channel summary information created by a single publisher, a combination of publishers, or all publishers.

Figure 11:
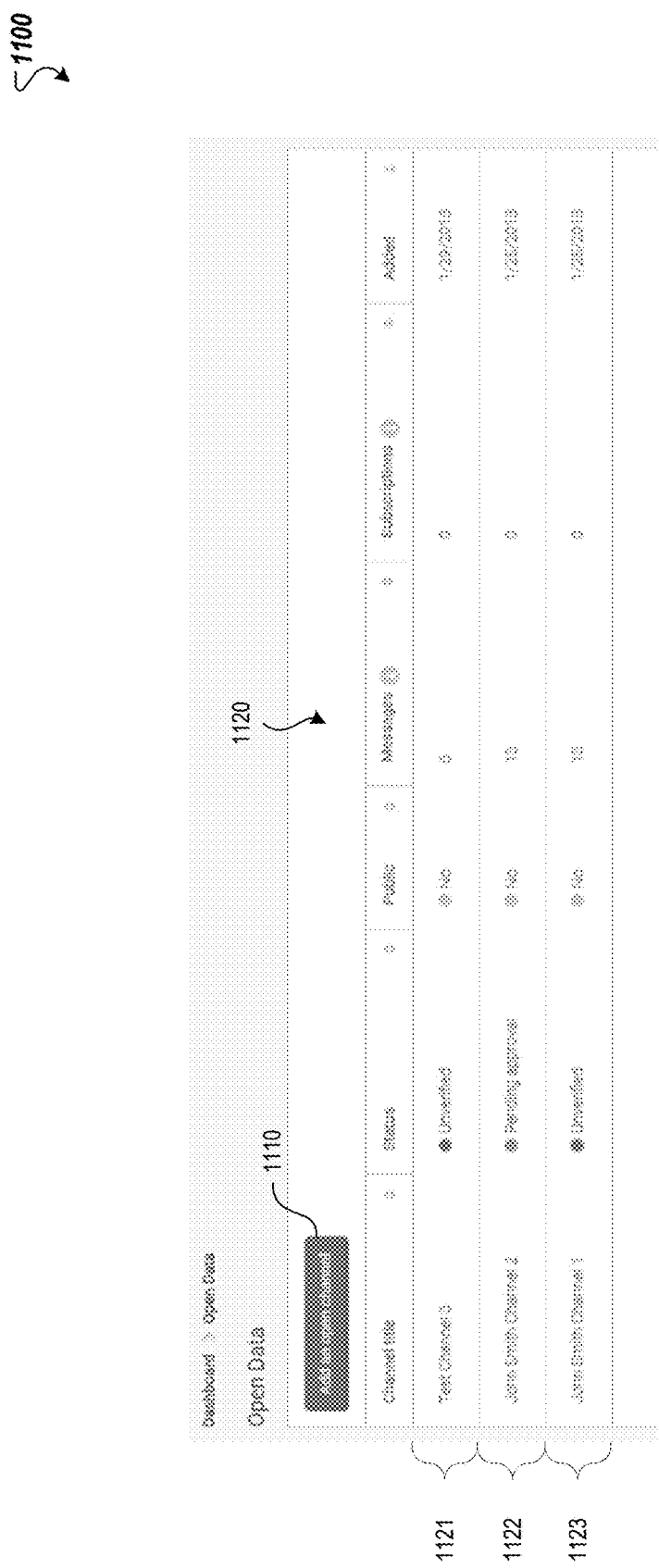
FIG. 11 is a diagram illustrating an example graphical user interface (GUI) that may be provided by a channel management component.

FIG. 11 is a diagram illustrating an example GUI 1100 that may be provided by a channel management component (e.g., channel management component 810 illustrated in FIG. 8). The channel management component may provide the GUI 1100 to a publisher in an open data ecosystem (e.g., open data ecosystem 805 illustrated in FIG. 8). As discussed above, a publisher may be a user that may publish messages in one or more channels of the open data ecosystem. The GUI 1100 may be displayed to the publisher by a publisher component (e.g., a web browser, an application, etc.), as discussed above. The GUI 1100 illustrated in FIG. 11 includes example GUI elements. In other embodiments, the GUI 1100 may include various other GUI elements such as text fields, search bars, buttons, radio buttons, toggle buttons, menus, overlays, drop down menus, links (e.g., web links), slide bars, tabs, lists, icons, text images, graphics, text boxes, windows, overlays, or other appropriate user interface widgets or elements.

The GUI 1100 includes a button 1110 and a table 1120. The button 1110 may allow a publisher to create a new channel, as discussed in more detail below. The table 1120 may include a list of the channels associated with the publisher (e.g., channels created by the publisher), one or more statuses of the channels, and statistics related to the channels. For purposes of illustration and not limitation, the table 1120 includes three rows, 1121, 1122, and 1123, although the table 1120 can include any suitable number of rows. Each row 1121, 1122, and 1123 represents one channel associated with the publisher. Each row 1121, 1122, and 1123 includes the following fields: 1) Channel title; 2) Status; 3) Public; 4) Messages; 5) Subscribers; and 6) Added. The "Channel title" field may indicate the name of the channel. The "Status" field may indicate the current approval status (e.g., verified, unverified, pending approval, temporary hold, or some other appropriate status) for approving the channel to be a public channel (or private channel) or to be added to the open data ecosystem. For example, the Status for John Smith Channel 2 indicates that the channel is currently "Pending approval" for being added to the open data ecosystem. The "Public" field may indicate whether or not (e.g., "Yes" or "No") the channel is public. The "Messages" field may indicate the number of messages that have been published to the channel. The "Subscriptions" field may indicate that number of subscribers to the channel. The "Added" field may indicate the date when the channel was created. Additional or alternative fields are possible.

Figure 12:
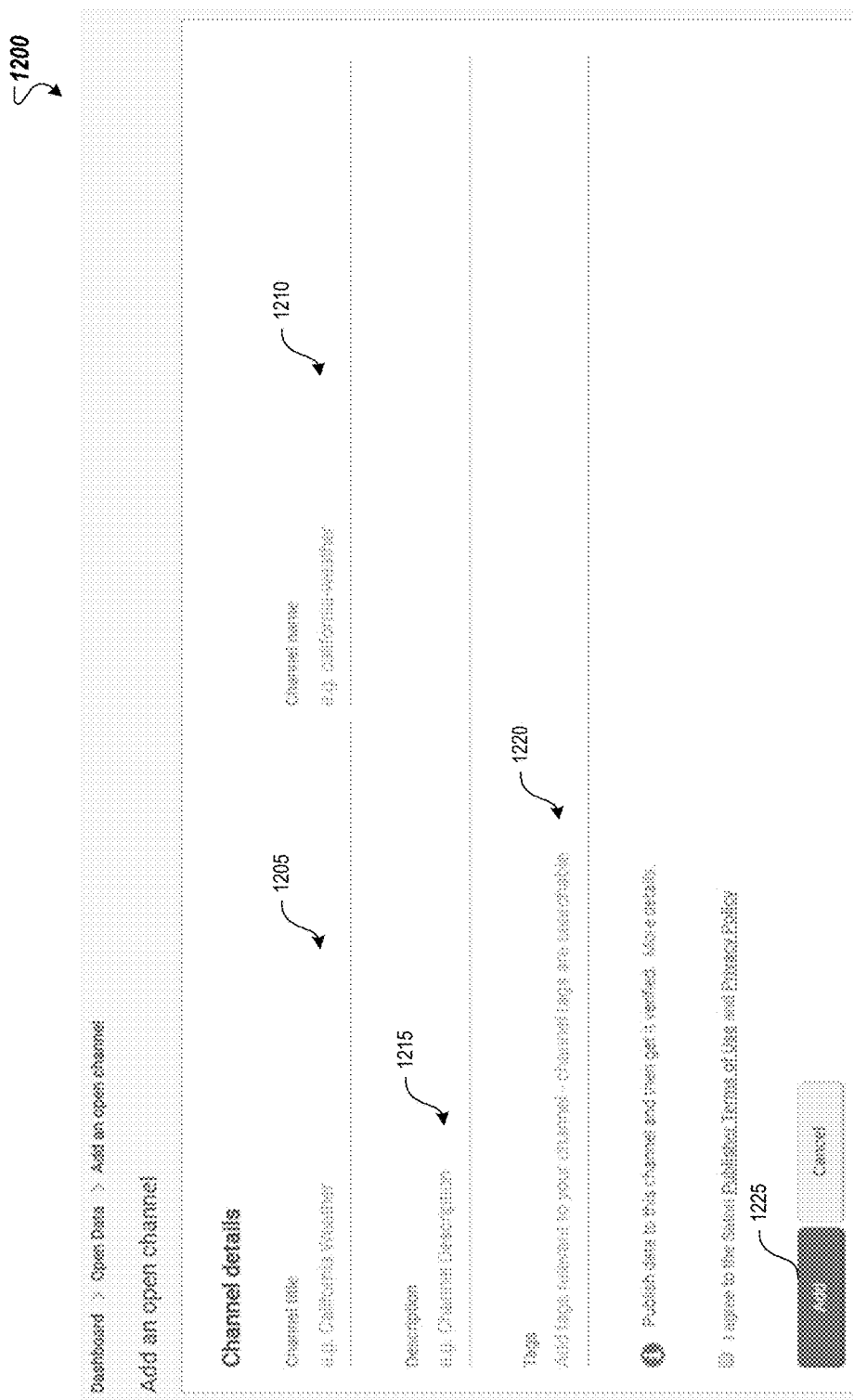
FIG. 12 is a diagram illustrating an example graphical user interface (GUI) that may be provided by a channel management component.

FIG. 12 is a diagram illustrating an example GUI 1200 that may be provided by a channel management component (e.g., channel management component 810 illustrated in FIG. 8). The channel management component may provide the GUI 1200 to a publisher in an open data ecosystem (e.g., open data ecosystem 805 illustrated in FIG. 8). As discussed above, a publisher may be a user that may publish messages in one or more channels of the open data ecosystem. The GUI 1200 may be displayed to the publisher by a publisher component (e.g., a web browser, an application, etc.), as discussed above. The GUI 1200 illustrated in FIG. 12 includes example GUI elements. In other embodiments, the GUI 1200 may include various other GUI elements such as text fields, search bars, buttons, radio buttons, toggle buttons, menus, overlays, drop down menus, links (e.g., web links), slide bars, tabs, lists, icons, text images, graphics, text boxes, windows, overlays, or other appropriate user interface widgets or elements.

Referring to FIG. 11, the GUI 1200 may be provided to the publisher when the user clicks, activates, selects, etc., the button 1110 illustrated in FIG. 11. The GUI 1200 may allow the publisher to create a channel and provide channel information for the channel. The GUI 1200 includes text fields 1205, 1210, 1215, and 1220, and button 1225. The text field 1205 may allow the publisher to provide a title for the channel. The text field 1210 may allow the publisher to provide a namespace for the channel. The namespace may be an identifier (e.g., an internal identifier) that may be used by the open data ecosystem to identify the channel. The text field 1215 may allow the publisher to provide a description for the channel. For example, the text field may allow the publisher to provide a written description of the subject matter of the messages published in the channel. Text field 1220 may allow the publisher to provide one or more tags for the channel. A tag may be defined values (e.g., alphanumeric values, phrases, words, etc.) that may describe the subject matter of the messages published in the channel. The button 1225 may allow the publisher to create the channel after the publisher has provided the channel information using the text fields 1205, 1210, 1215, and 1220.

In other embodiments, other types of channel information may be provided by the publisher and the GUI 1200 may include other GUI elements to allow the publisher to provide the other types of channel information. For example, the GUI may include additional text fields, drop down menus, or other appropriate GUI elements to allow the user to specify whether the channel is public or private, whether there is any limit to the number of messages that can be published on the channel (e.g., a maximum message rate), or any other additional or alternative types of channel information.

Figure 13:
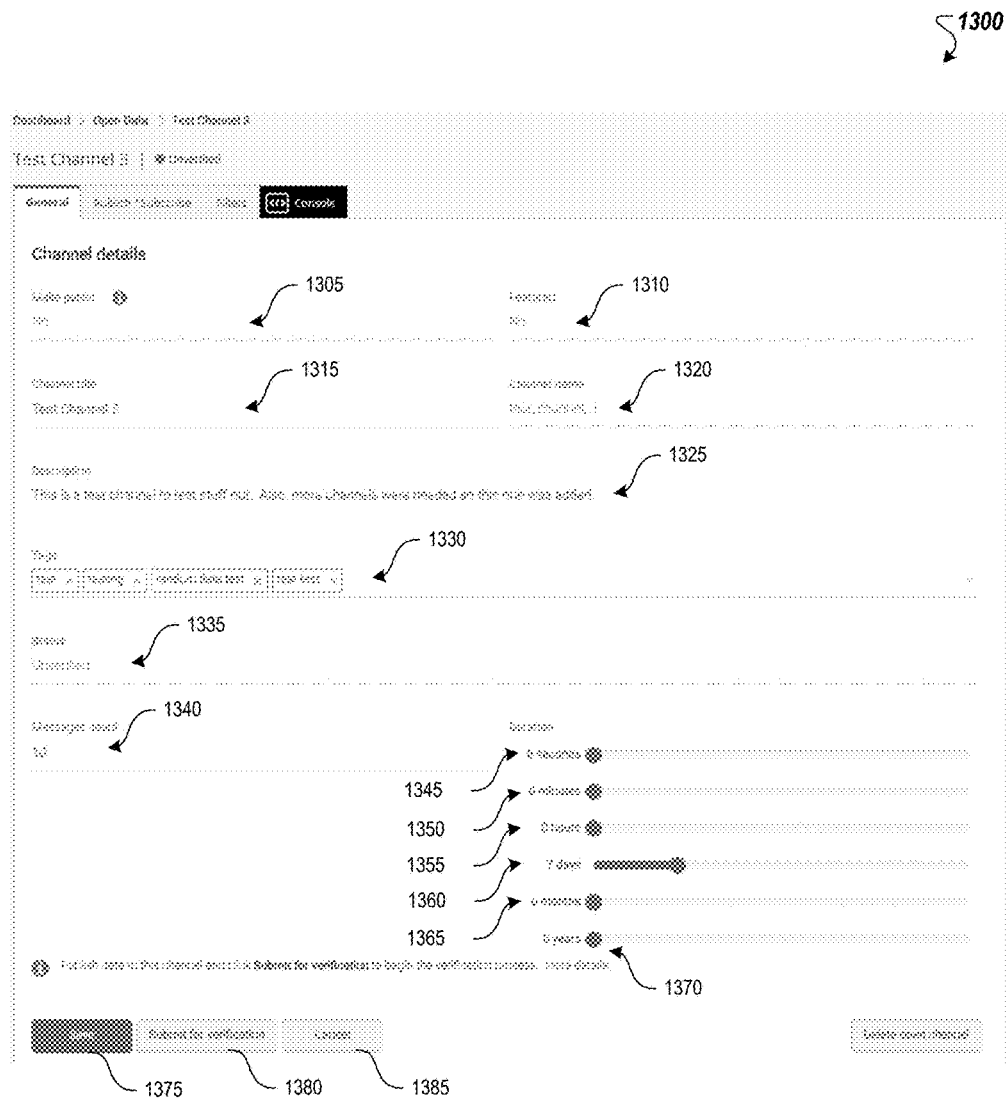
FIG. 13 is a diagram illustrating an example graphical user interface (GUI) that may be provided by a channel management component.

FIG. 13 is a diagram illustrating an example GUI 1300 that may be provided by a channel management component (e.g., channel management component 810 illustrated in FIG. 8). The channel management component may provide the GUI 1300 to a publisher in an open data ecosystem (e.g., open data ecosystem 805 illustrated in FIG. 8). As discussed above, a publisher may be a user that may publish messages in one or more channels of the open data ecosystem. The GUI 1300 may be displayed to the publisher by a publisher component (e.g., a web browser, an application, etc.), as discussed above. The GUI 1300 illustrated in FIG. 13 includes example GUI elements. In other embodiments, the GUI 1300 may include various other GUI elements such as text fields, search bars, buttons, radio buttons, toggle buttons, menus, overlays, drop down menus, links (e.g., web links), slide bars, tabs, lists, icons, text images, graphics, text boxes, windows, overlays, or other appropriate user interface widgets or elements.

Referring to FIG. 11, the GUI 1300 may be provided to the publisher when the user selects, clicks, or activates one of the channels listed in table 1120. For example, the GUI 1300 may be provided to the publisher when the publisher selects the channel "Test Channel 3." The GUI 1300 may display channel information for a channel associated with the user. The GUI 1300 may include text fields 1305 through 1340, slider bars 1345 through 1370, and buttons 1375 through 1385. The text fields 1305 through 1340 may indicate the current channel information for the channel. Text field 1305 may indicate whether the channel is currently public. Text field 1310 may indicate whether the channel is currently a featured channel. As discussed above, a featured channel may be a channel which may be highlighted, displayed, or otherwise made more prominent relative to other channels, to users of the open data ecosystem.

Text field 1315 may indicate the current title of the channel. Text field 1320 may indicate the current namespace of the channel. Text field 1325 may indicate the current description of the channel. Text field 1330 may indicate the current tags for the channel. Text field 1335 may indicate the current status of the channel. For example, text field 1335 may indicate the current status of a request to make the channel public or to verify the channel. Text field 1340 may indicate the number of messages that are have been published to the channel. For purposes of illustration and not limitation, text field 1340 may indicate that a total count of ten messages (or some other appropriate number of messages) have been published in the channel since the channel was created or during some other time period. The text fields 1305 through 1340 may also allow the publisher to change or update the channel information for the channel. For example, the user may update the title of the channel by providing an updated title using text field 1315. In another example, the publisher may update the description of the channel by providing an updated description in the text field 1330.

Slider bars 1345-1370 may indicate the total duration for which a channel may exist, which can be specified in increments of, for example, seconds, minutes, hours, days, months, and/or years. For example, slider bar 1345 may be used to indicate the duration of the channel in seconds. Slider bar 1350 may be used to indicate the duration of the channel in minutes. Slider bar 1355 may be used to indicate the duration of the channel in hours. Slider bar 1360 may be used to indicate the duration of the channel in days (e.g., 7 days). Slider bar 1365 may be used to indicate the duration of the channel in months. Slider bar 1370 may be used to indicate the duration of the channel in years. The total duration of the channel may be determined by the sum of the individual durations specified by slider bars 1345-1370. In the example illustrated in FIG. 13, the total duration of "Test Channel 3" is 7 days (i.e., 0 seconds+0 minutes+0 hours+7 days+0 months+0 years). After the duration expires, the channel can be automatically deleted or otherwise deactivated (e.g., by the channel management component).

Button 1375 (e.g., the "Save" button) may allow a publisher to save any changes to the channel information or changes to the amount of time used to indicate the duration of the channel. For example, after indicating an updated name for the channel, the publisher may save the updated channel information (e.g., the updated name) by clicking, selecting, activating, etc. the button 1375. Button 1385 (e.g., the "Cancel" button) may allow the publisher to cancel any changes to the channel information or changes to the amount of time used to indicate the duration of the channel. For example, if the publisher does not want to use the updated name or otherwise make any changes to the channel information, the publisher may by click, select, activate, etc. the button 1385. Button 1380 may be used by the publisher to submit a request to convert or reconfigure the channel from private to public (e.g., to reconfigure the channel as a public channel or vice versa). Alternatively, button 1380 may be used by the publisher to submit a request to have the channel verified (e.g., by the administrator) for meeting certain basic channel requirements (e.g., the channel title/name are provided and are not profane, a sufficient description was provided, a minimum number of tags were provided, etc.), so that the channel can be added to the open data ecosystem.

Figure 14:
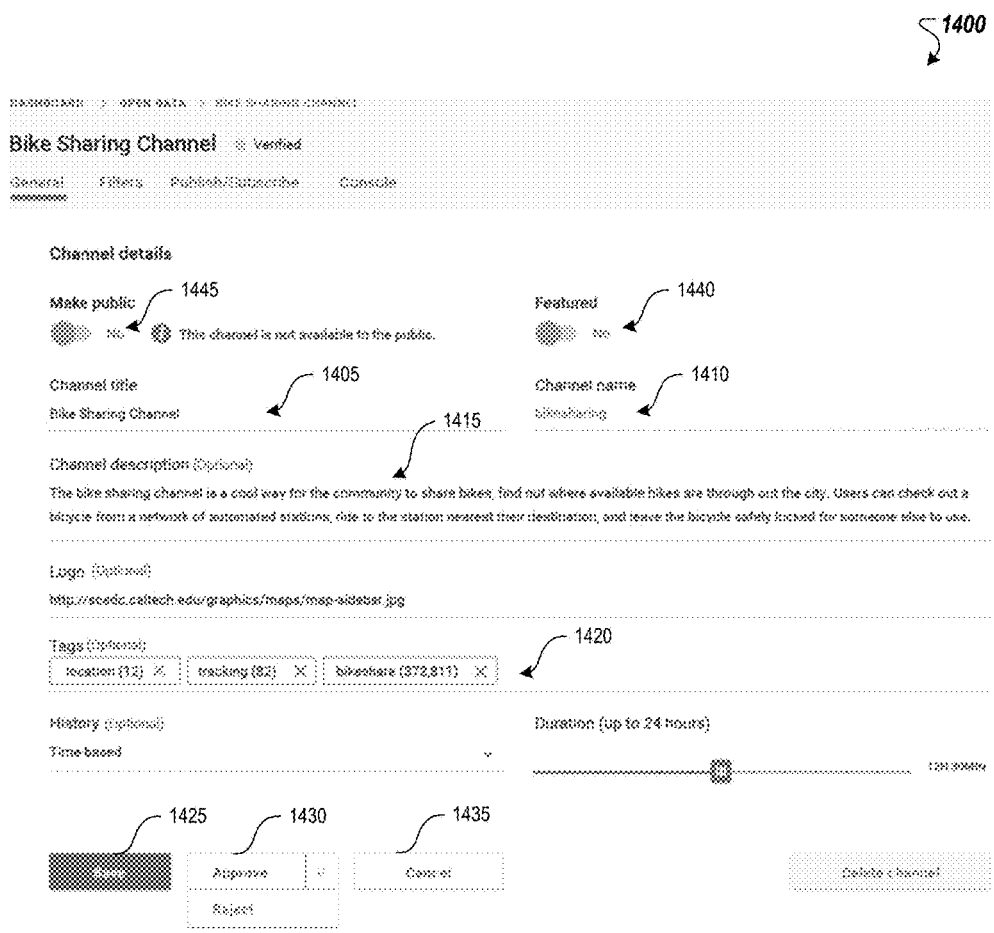
FIG. 14 is a diagram illustrating an example graphical user interface (GUI) that may be provided by a channel management component.

FIG. 14 is a diagram illustrating an example GUI 1400 that may be provided by a channel management component (e.g., channel management component 810 illustrated in FIG. 8). The channel management component may provide the GUI 1400 to an administrator in an open data ecosystem (e.g., open data ecosystem 805 illustrated in FIG. 8). As discussed above, an administrator may be a user who may be able to configure or manage channels even though the administrator is not associated with the channels. For example, an administrator may be able to manage or configure the channels created by a publisher (e.g., another user). In some embodiments, the administrator may have more control over or access to the channels of the open data ecosystem than the publishers. The GUI 1400 may be displayed to the administrator by an administrator component (e.g., a web browser, an application, etc.), as discussed above. The GUI 1400 illustrated in FIG. 14 includes example GUI elements. In other embodiments, the GUI 1400 may include various other GUI elements such as text fields, search bars, buttons, radio buttons, toggle buttons, menus, overlays, drop down menus, links (e.g., web links), slide bars, tabs, lists, icons, text images, graphics, text boxes, windows, overlays, or other appropriate user interface widgets or elements.

Referring to FIG. 11, GUI 1100 (or some other similar GUI) may be displayed to an administrator in some embodiments. However, for the administrator, the listing of channels in the GUI 1100 may include channels with which the administrator is not associated. For example, the administrator may see all of the channels in the open data ecosystem even though the channels were created by other users, such as other publishers. In another example, the administrator may be able to see the channels associated with a subset of the publishers in the open data ecosystem. In some embodiments, the table 1120 may also indicate the status of requests to convert the channels in the list to public channels. For example, the statuses in the table 1120 may indicate which channels are public, which channels are awaiting approval for conversion from private to public (or vice versa) or to be added to the open data ecosystem, which channels were rejected for conversion from private to public (or vice versa) or rejected from being added to the open data ecosystem, and other appropriate statuses. The GUI 1400 may be provided to the administrator when the administrator selects, clicks, activates, etc., one of the channels in the GUI 1100.

The GUI 1400 includes text fields 1405 through 1420, buttons 1425 and 1435, drop down menu 1430, and toggle buttons 1440 and 1445. The text fields 1405 through 1420 may indicate channel information about the channel to the administrator. Text field 1405 may indicate the title of the channel. Text field 1410 may indicate a namespace for the channel. Text field 1415 may indicate the description of the channel. Text field 1420 may indicate tags of the channel. The administrator may update the channel information using the text fields 1405 through 1420, as discussed above.

Drop down menu 1430 may allow the administrator to indicate whether the channel has satisfied one or more conditions for converting the channel from private to public (or vice versa) or for adding the channel to the open data ecosystem. For example, the drop down menu 1430 includes two options, "Approve" and "Reject." The administrator may select the "Approve" option when the channel satisfies the conditions for converting the channel from private to public (or vice versa) or for adding the channel to the open data ecosystem. For example, the administrator may select the "Approve" option when a minimum number of messages have been published in a period of time, as discussed above. Alternatively, the administrator may select the "Approve" option when the channel title, name, description, and/or tags meet certain minimum requirements for adding the channel to the open data ecosystem requirements (e.g., the channel title/name are provided and are not profane, a sufficient description was provided, a minimum number of tags were provided, etc.), as discussed above. The channel management component of the open data ecosystem may convert or reconfigure the channel as a public channel when the administrator selects the "Approve" option. In another example, the administrator may select the "Reject" option if the conditions for converting the channel from private to public (or vice versa) are not satisfied. For example, if the channel does not have a minimum number of subscribers, the administrator may select the "Reject" option. The channel management component of the open data ecosystem may refrain from converting or reconfiguring the channel as a public channel when the administrator selects the "Reject" option. Alternatively, the administrator may select the "Reject" option if any of the channel title, name, description, or tags do not meet certain minimum requirements for adding the channel to the open data ecosystem (e.g., the channel title/name were not provided or are profane, no description was provided, no tags were provided, etc.). Button 1425 may allow the user to save any change to the channel information for the channel. For example, button 1425 may allow the administrator to save an updated channel name for the channel. In another example, button 1425 may allow the administrator to save the selection of whether the channel satisfies the conditions for converting from private to public. Button 1435 may allow the administrator to cancel the changes to the channel, as discussed above. Toggle button 1440 may allow the user to specify whether or not the channel is a featured channel, as discussed above. Toggle button 1445 may allow the user to specify whether or not the channel is public.

Figure 15:
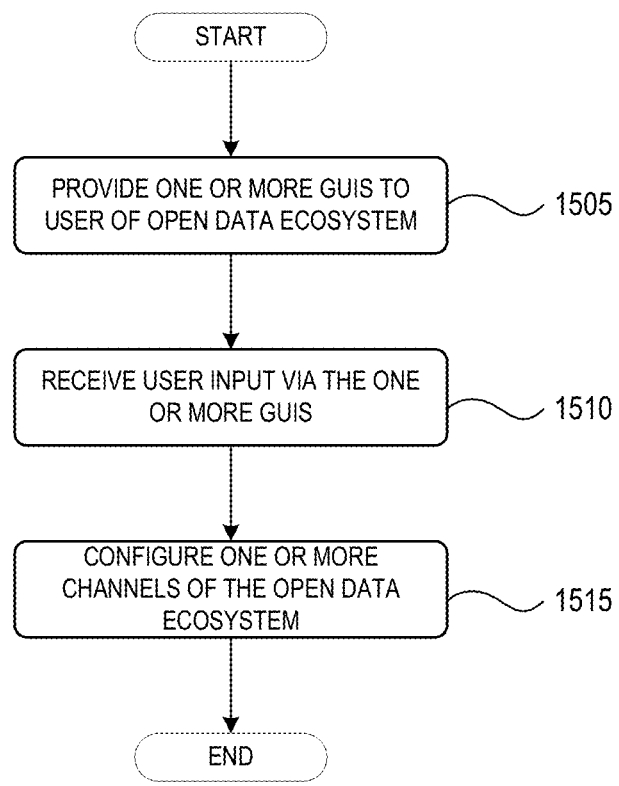
FIG. 15 is a flowchart of an example method for configuring one or more channels in an open data ecosystem.

FIG. 15 is a flowchart of an example method 1500 for configuring one or more channels in an open data ecosystem. Method 1500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 1500 can be implemented using, for example, a computing device, a channel management component (e.g., channel management component 810 illustrated in FIG. 8), a messaging system (e.g., messaging system 820 illustrated in FIG. 8), an open data ecosystem 805, an application, software components, etc. The method 1500 begins at block 1505 where the method 1500 provides one or more GUIs to a user of the open data ecosystem, as discussed above. For example, the method 1500 may provide one or more GUIs to a publisher or an administrator of the open data ecosystem. The one or more GUIs may include text fields, entry fields, search bars, check boxes, buttons, radio buttons, toggle buttons, drop down menus, links (e.g., web links), slide bars, tabs, lists, icons, text images, graphics, text boxes, windows, overlays, or other user interface widgets or elements that may allow the user to configure one or more channels of the open data ecosystem, as discussed above. In some embodiments, the GUI may display information such as channel information, account information, statuses of channels, statistics for channels, etc., to the user, as discussed above.

At block 1510, the method 1500 may receive user input via the one or more GUIs. For example, the user may type in text, select options on a drop down menu, select a checkbox, move a slider bar, etc. The user input may indicate account information, channel information, updated channel information, names of users and access permissions for channels, a request to convert a channel from private to public or vice versa, whether a channel has been approved for conversion from private to public, etc., as discussed above. At block 1515, the method 1500 may configure one or more channels of the open data ecosystem based on the user input, as discussed above. For example, the method 1500 may update channel information, update account information, convert a channel from private to public, etc. based on the user input.

Figure 16:
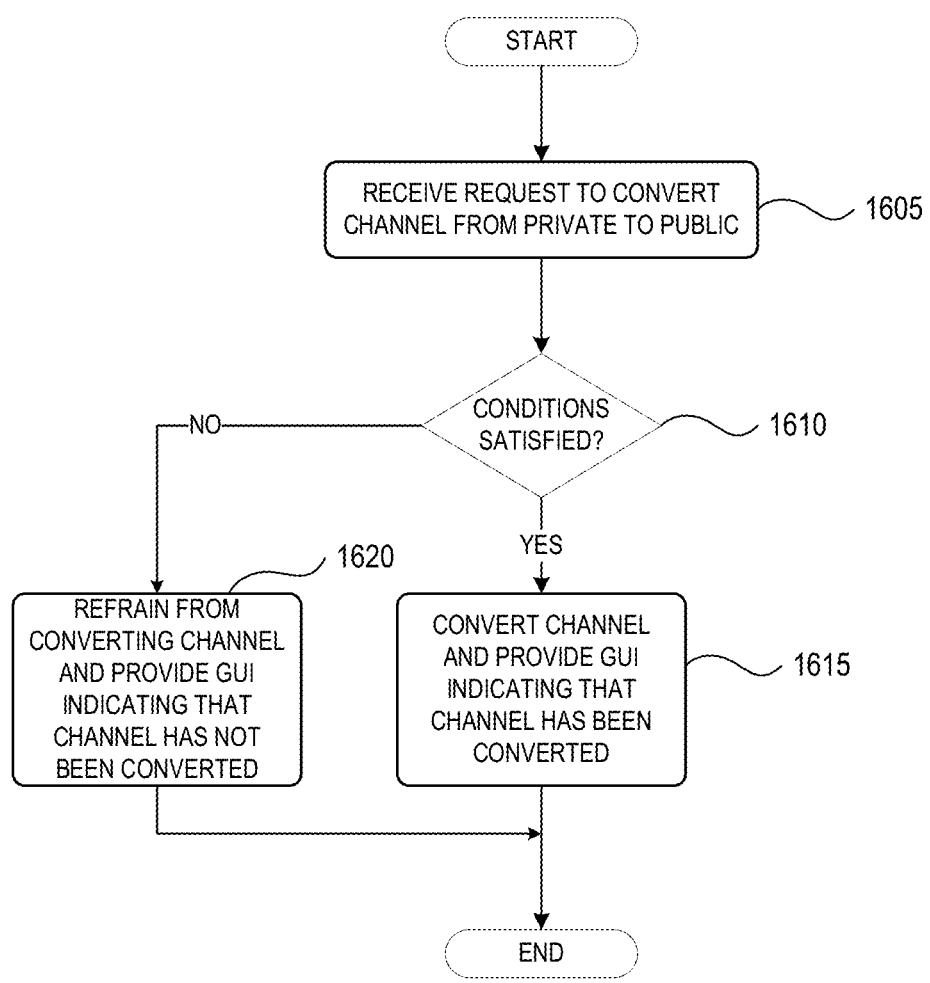
FIG. 16 is a flowchart of an example method for configuring one or more channels in an open data ecosystem.

FIG. 16 is a flowchart of an example method 1600 for configuring one or more channels in an open data ecosystem. Method 1600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 1600 can be implemented using, for example, a computing device, a channel management component (e.g., channel management component 810 illustrated in FIG. 8), a messaging system (e.g., messaging system 820 illustrated in FIG. 8), an open data ecosystem 805, an application, software components, etc. The method 1600 begins at block 1605 where the method 1600 receives a request to convert the channel from private to public (e.g., to convert the channel from a private channel to a public channel). The request to convert the channel may be received via one or more GUIs, as discussed above. At block 1610, the method 1600 determines whether one or more conditions for converting the channel are satisfied (e.g., whether a threshold number of conditions or all of the conditions are satisfied). For example, the method 1600 may determine whether the description for a channel provides sufficient information about the content of the channel, whether the description is appropriate for the general public, whether the tags for the channel provide information about the content of the channel, whether the tags are appropriate for the general public, whether a threshold number of messages have been published to the channel over a period of time, or whether other appropriate conditions are satisfied, as discussed above. If the threshold number of conditions or all of the conditions are satisfied, at block 1615 the method 1600 may convert the channel from a private channel to a public channel and may provide a GUI indicating that the channel has been converted, as discussed above. If less than threshold number of conditions or less than all of the conditions are satisfied, at block 1620 the method 1600 may refrain from converting the channel (e.g., may not convert the channel from private to public) and may provide a GUI indicating that the channel has not been converted, as discussed above. The GUI may also indicate one or more reasons why the channel was not converted, as discussed above. For example, the GUI may indicate which conditions were not satisfied, as discussed above Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer processing device, a computer, a system on a chip, or multiple ones, or combinations, of the foregoing. A computer processing device may include one or more processors which can include special purpose logic circuitry, e.g., an FPGA (field programmable gate array) or an ASIC (application-specific integrated circuit), a central processing unit (CPU), a multi-core processor, etc. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
providing one or more graphical user interfaces to a first user of an open data ecosystem, wherein:
the open data ecosystem comprises a plurality of public channels and a plurality of private channels; and
users of the open data ecosystem are able to receive messages on each of the plurality of public channels;
receiving first user input indicating channel configuration information from the first user via the one or more graphical user interfaces; and
configuring, by a computer processing device, one or more channels of the plurality of public channels or the plurality of private channels based on the channel configuration information received from the first user via the one or more graphical user interfaces.

2. The method claim 1, wherein the first user input indicates account information for the first user and wherein configuring the one or more channels comprises:
creating an account for the first user based on the account information.

3. The method claim 1, wherein the first user input indicates channel information for a first channel of the one or more channels and wherein configuring the one or more channels comprises:
creating the first channel based on the channel information.

4. The method of claim 1, wherein the first user input indicates updated channel information for a first channel of the one or more channels and wherein configuring the one or more channels comprises:
updating the channel information for the first channel based on the updated channel information.

5. The method claim 1, wherein the first user input indicates one or more users and access permissions for the one or more users to the one or more channels and wherein configuring the one or more channels comprises:
granting access to the one or more channels for the one or more users, based on the access permissions.

6. The method of claim 1, wherein a first graphical user interface of the one or more graphical user interfaces is configured to provide statistics related to the one or more channels.

7. The method of claim 1, wherein a first graphical user interface of the one or more graphical user interfaces is configured to provide one or more of:
a listing of the one or more channels, wherein the one or more channels are associated with the first user;
one or more statuses of the one or more channels; and
statistics related to each of the one or more channels.

8. The method of claim 1, wherein a first graphical user interface of the one or more graphical user interfaces is configured to indicate existing channel information for a first channel of the one or more channels.

9. The method claim 1, wherein the first user input indicates a request to convert a first channel of the one or more channels from private to public and wherein configuring the one or more channels comprises:
   determining whether the first channel satisfies one or more conditions for converting the first channel from private to public.

10. The method claim 9, wherein configuring the one or more channels further comprises:
    converting the first channel from private to public in response to determining that the first channel satisfies the one or more conditions; and
    providing a second graphical user interface indicating that the first channel has been converted from private to public.

11. The method claim 9, wherein configuring the one or more channels further comprises:
    providing a second graphical user interface indicating that the first channel has not been converted from private to public in response to determining that the first channel does not satisfy the one or more conditions.

12. The method claim 9, wherein the second graphical user interface indicates one or more reasons why the one or more conditions were not satisfied.

13. The method of claim 9, wherein determining whether the first channel satisfies the one or more conditions comprises:
    providing a second graphical user interface to an administrator of the open data ecosystem, wherein the second graphical user interface indicates a listing of channels that are public or are awaiting approval for conversion from private to public.

14. An apparatus, comprising:
    a computer processing device to:
        provide one or more graphical user interfaces to a first user of an open data ecosystem, wherein:
            the open data ecosystem comprises a plurality of public channels and a plurality of private channels; and
            users of the open data ecosystem are able to receive messages on each of the plurality of public channels;
        receive first user input indicating channel configuration information from the first user via the one or more graphical user interfaces; and
        configure one or more channels of the plurality of public channels or the plurality of private channels based on the channel configuration information received from the first user via the one or more graphical user interfaces.

15. The apparatus claim 14, wherein the first user input indicates account information for the first user and wherein to configure the one or more channels the computer processing device is to:
    create an account for the first user based on the account information.

16. The apparatus claim 14, wherein the first user input indicates channel information for a first channel of the one or more channels and wherein to configure the one or more channels the computer processing device is to:
    create the first channel based on the channel information.

17. The apparatus of claim 14, wherein the first user input indicates updated channel information for a first channel of the one or more channels and wherein to configure the one or more channels the computer processing device is to:
    update the channel information for the first channel based on the updated channel information.

18. The apparatus claim 14, wherein the first user input indicates one or more users and access permissions for the one or more users to the one or more channels and wherein to configure the one or more channels the computer processing device is to:
    grant access to the one or more channels for the one or more users, based on the access permissions.

19. The apparatus of claim 14, wherein a first graphical user interface of the one or more graphical user interfaces is configured to provide statistics related to the one or more channels.

20. A non-transitory computer-readable medium having instruction stored thereon that, when executed by a computer processing device, cause the computer processing device to:
    provide one or more graphical user interfaces to a first user of an open data ecosystem, wherein:
        the open data ecosystem comprises a plurality of public channels and a plurality of private channels; and
        users of the open data ecosystem are able to receive messages on each of the plurality of public channels;
    receive first user input indicating channel configuration information from the first user via the one or more graphical user interfaces; and
    configure, by the computer processing device, one or more channels of the plurality of public channels or the plurality of private channels based on the channel configuration information received from the first user via the one or more graphical user interfaces.

* * * * *